US012486497B2

(12) United States Patent
Tian et al.

(10) Patent No.: US 12,486,497 B2
(45) Date of Patent: Dec. 2, 2025

(54) F-GENOTYPE MUMPS VIRUS ATTENUATED STRAIN AND CONSTRUCTION METHOD THEREFOR AND APPLICATION THEREOF

(71) Applicants: SHANGHAI KING-CELL BIOTECHNOLOGY CO. LTD., Shanghai (CN); BEIJING CELL-FUSION BIOTECHNOLOGY CO., LTD., Beijing (CN)

(72) Inventors: Dayong Tian, Shanghai (CN); Yajing Zhang, Shanghai (CN); Fengcai Zhu, Shanghai (CN); Zhenfang Fu, Shanghai (CN); Lixia Xie, Shanghai (CN); Yuanbao Liu, Shanghai (CN); Juncheng Ruan, Shanghai (CN); Jinliang Wang, Shanghai (CN); Qi An, Shanghai (CN)

(73) Assignees: SHANGHAI KING-CELL BIOTECHNOLOGY CO. LTD., Shanghai (CN); BEIJING CELL-FUSION BIOTECHNOLOGY CO., LTD., Beijing (CN)

(*) Notice: Subject to any disclaimer, the term of this patent is extended or adjusted under 35 U.S.C. 154(b) by 855 days.

(21) Appl. No.: 17/755,663

(22) PCT Filed: Nov. 3, 2020

(86) PCT No.: PCT/CN2020/126248
§ 371 (c)(1),
(2) Date: May 4, 2022

(87) PCT Pub. No.: WO2021/088825
PCT Pub. Date: May 14, 2021

(65) Prior Publication Data
US 2022/0389391 A1  Dec. 8, 2022

(30) Foreign Application Priority Data

Nov. 4, 2019 (CN) .......................... 201911066044.3

(51) Int. Cl.
*C12N 7/00* (2006.01)
*A61K 39/165* (2006.01)
*A61K 39/00* (2006.01)

(52) U.S. Cl.
CPC .............. *C12N 7/00* (2013.01); *A61K 39/165* (2013.01); *A61K 2039/5252* (2013.01);
(Continued)

(58) Field of Classification Search
None
See application file for complete search history.

(56) References Cited

U.S. PATENT DOCUMENTS

2022/0389391 A1* 12/2022 Tian .................... A61K 39/165

FOREIGN PATENT DOCUMENTS

| CN | 1347458 A | 5/2002 |
| CN | 109593784 A | 4/2019 |

(Continued)

OTHER PUBLICATIONS

Naruse et al. (Medical Microbiology and Immunology. Jan. 1986; 174: 295-304).*

(Continued)

*Primary Examiner* — Shanon A. Foley
(74) *Attorney, Agent, or Firm* — HSML P.C.

(57) ABSTRACT

Provided are an F-genotype mumps virus attenuated strain, a construction method therefor and an application thereof. The attenuated strain is a mumps virus with the accession number of CCTCC NO: V201950. Further provided are a (Continued)

vaccine composition containing the F-genotype mumps virus attenuated strain as an active ingredient and a preparation method thereof.

9 Claims, 6 Drawing Sheets

Specification includes a Sequence Listing.

(52) U.S. Cl.
CPC .... *A61K 2039/54* (2013.01); *A61K 2039/545* (2013.01); *C12N 2760/18721* (2013.01); *C12N 2760/18734* (2013.01)

(56) References Cited

FOREIGN PATENT DOCUMENTS

| CN | 109628414 A | 4/2019 | | |
|----|----|----|----|----|
| CN | 111019910 A | 4/2020 | | |
| WO | WO-2012116253 A2 | * | 8/2012 | ............. A61K 39/12 |

OTHER PUBLICATIONS

The extended European search report (EESR) issued in European Application No. 20885195.6, dated Nov. 13, 2023. (11 pages).

Zengel et al., "Immunogenicity of mumps virus vaccine candidates matching circulating genotypes in the United States and China", Vaccine. Jul. 13, 2017;35(32):3988-3994. doi: 10.1016/j.vaccine. 2017.05.084. Epub Jun. 13, 2017. PMID: 28623030; PMCID: PMC5785236. Cited in EESR.

Xu et al., "Rescue of wild-type mumps virus from a strain associated with recent outbreaks helps to define the role of the SH ORF in the pathogenesis of mumps virus", Virology. Aug. 15, 2011;417(1):126-36. doi: 10.1016/j.virol.2011.05.003. Epub Jun. 14, 2011. PMID: 21676427; PMCID: PMC3959920. Cited in EESR.

International Search Report (with English translation) and Written Opinion issued in PCT/CN2020/126248, dated Jan. 26, 2021, 14 pages.

Malik et al., "Discrimination of Mumps Virus Small Hydrophobic Gene Deletion Effects from Gene Translation Effects on Virus Virulence", Journal of Virology, vol. 85, No. 12, Apr. 6, 2011.

Gao et al., "construction of a reverse genetics system of mumps virus vaccine strain Jeryl Lynn 1", China J Biologicals Oct. 2019, vol. 32 No. 10, with English abstract, 6 pages provided.

Office Action issued in corresponding Chinese Application No. 201911066044.3, dated Sep. 7, 2021, with English machine translation, 11 pages provided.

Office Action issued in corresponding Chinese Application No. 201911066044.3, dated Dec. 3, 2021, with English machine translation, 7 pages provided.

* cited by examiner

SEQUENCE LISTING

```
<160> NUMBER OF SEQ ID NOS: 45

<210> SEQ ID NO 1
<211> LENGTH: 174
<212> TYPE: DNA
<213> ORGANISM: Mumps virus

<400> SEQUENCE: 1
atgccggcaa tccaccctcc cttataccta acatttctat tgctaattct tcttcatctg      60
atcttaaatt tatatgtctg aattatgcta accattactc acaagactgc ggtgcaacat     120
gcagcactgt accagagatc cctctttcgt tggagtttcg atcactcact ctag           174

<210> SEQ ID NO 2
<211> LENGTH: 18
<212> TYPE: DNA
<213> ORGANISM: Artificial sequence
<220> FEATURE:
<223> OTHER INFORMATION: Gene sequence after deletion of SH

<400> SEQUENCE: 2
```

```
atgccggcag ctagctag                                                  18
```

<210> SEQ ID NO 3
<211> LENGTH: 15228
<212> TYPE: DNA
<213> ORGANISM: Artificial sequence
<220> FEATURE:
<223> OTHER INFORMATION: Genome of F-genotype mumps virus attenuated
      strain

<400> SEQUENCE: 3

```
accaagggga aaatgaagat gggatattgg tagaacaaat agtgtaagaa acagtaagcc     60
cggaagtggt gttttgcgat ttcgaggccg ggctcgatcc tcaccttcca ttgtcgatag    120
aggatatttt gacactatct ggaaaatgtc gtctgtgctc aaagcatttg agcgattcac    180
gatagaacag gaacgccagg acaggggtga ggagggttca attccgccgg agacttttaaa  240
gtcagcagtc aaagtcttcg tcattaacac acccaatccc accacacgct accagatgct    300
aaacttttgc ctaagaataa tctgcagtca aaacgctagg gcgtctcaca gggtaggtgc    360
attgataaca ttattctcgc ttccctcagc aggcatgcaa atcatatta gattagcaga     420
tagatcaccc gaggctcaga tagaacgctg tgagattgat ggttttgagc ccggcacata    480
taggctgatt ccgaatgcac gcgccaatct tactgccaat gaaattgccg cctatgcttt    540
gcttgcagat gacctccctc aaccataaa taatggaact ccttatgtac atgcagatgt     600
tgaaggtcag ccatgtgatg agattgagca attcctggat cgatgctaca gtgtactaat    660
ccaggcttgg gtgatggtct gtaaatgtat gacagcatac gaccaacctg ctgggtctgc    720
tgatcggcga tttgctaagt accagcagca aggtcgcctg gaagcaagat acatgctgca    780
gccggaggcc caaaggttga ttcaaactgc catcaggaaa agtcttgttg ttagacagta    840
ccttaccttc gaactccaat tggcaagacg gcagggattg ctgtcaaaca gatactatgc    900
aatggtaggt gacattggaa agtacattga gaattcaggc cttactgcct tcttcctcac    960
cctcaaatac gcactaggta ctaaatggag tcctttgtca ttggccgcat tcacaggtga   1020
actcactaag cttcgatcct tgatgatgtt gtatcgggat ctcggggaac aagccagata   1080
ccttgctttg ttggaggctc cccaaataat ggactttgca cccgggggct acccattgat   1140
attcagttat gccatgggag tcggtacagt cctagatgtc cagatgcgaa attcactta    1200
tgcacgacct ttcctaaatg ctattactt ccagattggg gttgagaccg caagacggca   1260
acaaggcact gttgacaaca gagtagcaga tgatctaggc ctgactcctg agcaaagaac    1320
tgaggttact cagcttgttg acaggcttgc aagggcaga ggtgcaggga taccaggtgg    1380
gcctgtgaat ccatttgttc ctccagttca acagcaacaa cctgctgctg tatatgagga    1440
cattcctgca ttgaggaat cagatgacga cggcgatgaa gatggaggtg caggattcca    1500
aaatggagca caagcaccag ctgtaagaca gggaggtcaa aatgacttta gagtacagcc    1560
gttacaggat ccaattcaag cacagctttt catgccacta tatcctcaag tcagcaacat    1620
cccaaatcat cagaatcatc agatcaatcg catcgggggg atgaacacc aagatttatt    1680
acgatataac gagaatggtg attctcaaca agacgcgagg ggcgaacaag aaataccctt    1740
cccaaacaat cctaaccaaa acacacagtc gcaagtgggc gactgggatg agtaaaattac   1800
tgacatggtc agactacccc caaatgcaat taccccagga caatctagcc acagctaact   1860
gcccaaatcc actacattcc atcaatattt agtctttaag aaaaatttag gcccggaaag    1920
aattagttat acgaacatcg acaaagttat cttgatcgtg tttctttccg ggcaagccat    1980
```

```
ggatcaattt ataaaacaag atgagactgg tgatttaatt gagacaggaa tgaacgttgc   2040
aaatcatttc ctatccgccc ccattcaggg aaccaactcg ttgggcaaag ccacaatcat   2100
ccctggtgtt gcaccagtac tcattggcaa tccagatcaa agaacattc aatacccac    2160 cgcatcacat cagggatcta agtcaaaggg cagaagctca gggaccaggc ccatcatagt   2220
ctcatcttcc gaagggggca ctggagggac tcagattcct gagccccttt tcgcacaaac   2280
aggacaaggt ggcattgtca ccaccgttta tcaggatcca actatccaac caacaggttc   2340
atatcgaagt gtagaattgg ctaagatagg aaaagagaga atgattaatc gatttgttga   2400
aaaacccagg acctcaacgc cggtgacaga atttaagagg ggggccggga gcggctgctc   2460
aaggccagat aatccaagag gagggcatag acgggaatgg agcctcagct gggtccaagg   2520
agaggtccgg gtctttgagt ggtgcaaccc catatgctca cctatcactg ccgcagcaag   2580
attccactcc tgcaaatgtg ggaattgccc cgcaaagtgc gatcagtgcg aacgagatta   2640
tggacctcct tagagggatg gatgctcgtc tgcaacatct tgaacaaaag gtggacaagg   2700
tgcttgcaca gggcagcatg gtgacccaaa taaagaatga attatcaaca gtaaagacaa   2760
cactagctac aattgaggga atgatggcga ccgtaaagat catggatcct ggaaacccga   2820
caggagtccc agtcgatgag cttagaagaa gtttcagtga tcatgtaaca attattagtg   2880
gaccaggaga tgtgtcattc agctccggtg aagagcctac actgtattta gatgaactag   2940
caaggcctgt ccccaagcct cgtcctgcaa agcagccaaa accccaacca gtaaaggatt   3000
tagcaggacg gaaagtgatg ataaccaaaa tgatcactga ctgtgtggcc aaccctcaaa   3060
tgaagcaggt gtttgagcaa cgactggcaa aggccagcac ggaggatgcc ctgaatgaca   3120
tcaagcgaga catcatacgg agcgccatat gaatcaacct gaaacacaag acttgcggga   3180
aaatccacaa cttaagagcc acaatgattc cctgttaaat aaaaaataag cacgaacaca   3240
agtccgatcc aaccatagct gcaatggccg ggtcacagat caaaattccc cttccaaagc   3300
cccccgattc agactcccaa agactaaatg cattccctgt aattatggcc caaggaggta   3360
aagggcgact cctcagacag atcagactta ggaaaatatt atcagggggat ccgtctgatc   3420 agcaaattac atttgtgaat acatatggat tcatccgtgc caccccagaa acatccgagt   3480
tcatctctga atcatcacaa caaaaggtga ctcctgtagt gacggcgtgc atgctgtcct   3540
tcggtgctgg accagtacta aagacccgc aacatatgct gaaagctctt gaccagacag   3600
acatcagggt tcggaaaaca gcgagtgata aagagcagat cttattcgag atcaaccgta   3660
tccccaatct attcaggcat catcaaatat ctgcggacca tctgattcag gccagctccg   3720
ataaatatgt caagtcacca gcaaagttga ttgcaggagt aaattacatt tactgtgtca   3780 cattttatc tgtaacagtt tgctctgcct cactcaagtt tcgagttgcg cgcccattgc   3840
ttgctgcacg atctagatta gtaagagcag ttcagatgga agttttgctt caggtaactt   3900
gcaagaaaga ttcccaaatg gcaaagagca tgttaaatga ccctgatggc gaagggtgca   3960
ttgcatccgt gtggttccac ctgtgtaatc tgtgcaaagg caggaataaa cttagaagtt   4020
atgatgaaaa ttatttttgca tctaaatgcc gtaagatgaa tctgacagtc agcataggag   4080
acatgtgggg gccaaccatt ctagtccatg caggcgtca cattccgaca actgcaaaac   4140
cttttttcaa ctcaagaggc tgggtctgcc accccatcca ccaatcatca ccatcgttgg   4200
cgaagaccct atggtcatct gggtgcgaaa tcaaggctgc cagtgctatc ctccagggct   4260
cagattatgc atcactcgca aaaactgatg acataatata ctcaaagata aaagtcgata   4320
```

```
aggatgctgc caactacaag ggtgtatcct ggagtccatt caggaagtct gcctcaatga    4380
gcaacctatg aaaatttcct ctattcccat tgatgcctcc aggaggatca ataatcagtc    4440
tgatttgact ggtggtaact tgattgaaat tatagaaaaa ataagcctag aaggatatct    4500
tacttctcaa ctttcaaact ttgaaaagag aacctatcag taatcatgaa ggcttttta     4560 gttatttgct tgggctttgc agtcttttca tattctatct gtgtgaatat caacatcttg    4620
cagcaagttg atatatcaa gcaacaagtc aggcaactaa gctattactc acaaagttca    4680
agctcctaca tagtggtcaa gcttttaccg aatatccaac ccactgataa cagctgtgaa    4740
tttaagagtg taactcaata caataagacc ttgagtaatt tgctccttcc aattgcagaa    4800
aacataaaca atattgcatc gccctcacct gggtcaagac gtcataaaag gtttgctggc    4860
attgccatcg gcattgctgc gctcggtttt gcgaccgcag cacaagtaac tgccgctgtc    4920
tcattagttc aagcacagac aaatgcacgt gcgatagcgg cgatgaaaaa ttcaatacag    4980
gcaactaatc gagcagtctt cgaagtgaaa gaaggaactc aacagttagc tatagcggta    5040
caagcaatac aagaccacat caatactatt atgaacactc aattgagcaa tatgtcttgt    5100 cagatcctg ataaccagct tgcgacttcc ctaggattat acctaacaga attaacaaca    5160
gtgtttcagc cccaattaat taatccggca ctgtcaccga ttagtataca agccttgagg    5220
tctttgcttg gaagtatgac acttgcagtg gttcaagcaa cattatctac ttcaatttct    5280
gctgctgaaa tactaagtgc cggtctaatg gagggtcaga ttgtgtctgt tctgctagat    5340
gagatgcaga tgatagttaa gataaatatt ccaaccattg tcacacaatc aaatgcattg    5400
gtgattgact tctactcaat ttcgagcttt attaataatc aggaaaccat aattcaatta    5460
ccagacaggg tcttggagat cgggaatgaa cagtggagct atccagctaa aaattgcaag    5520
ttgacaagac acaacatatt ctgccaatac aatgaggcag agaggttgag cctagagtca    5580
aaactatgcc ttgcaggaaa tataagtgcc tgtgtgttct cacccatagc aggaagttat    5640
atgaggcgat ttgtagcact ggatggaaca attgttgcaa actgtcgaag tctaacgtgt    5700
ctatgcaaga gtccatctta tcctatatac caacctgacc atcatgcagt cacaaccgtt    5760
gatctaaccg catgtcaaac attgtcccta gacggattgg atttcagcat tgtctctcta    5820
agcaacatca cttacgctga gaatcttacc atttcattgt ctcagacaat caatactcaa    5880
cccattgaca tatcaactga actaagtaaa gttaatgcat ccctccaaaa tgccgttaag    5940
tacataaaag agagcaacca acaactccaa tctgtgagtg taaattccaa aatcggagct    6000
ataattctag cagccttagt cttgagcatc ctgtcaatca tcatttcgct attgttctgc    6060
tgctgggctt acattgcaac taaagaaatc aggagaatca acttcaaaac aaatcatatc    6120
aacacaatat caagtagtgt cgatgatctc atcaggtact aatcctaaca ttgtgattca    6180
ttctgcattg agaaaagatt tagaaaaaaa ccaaattaag aatgaatctc ctgggtcgt     6240 aacgtctcgt gaccctgccg ttgcactatg ccggcagcta gctagaaaga tctccaaccc    6300
ggacaagtcc caatccataa tgagggaaca ggctgcattc aaacaatgct gttcaatcat    6360
gagacataaa gaaaaagca ggccagaaca aactcaggat cacaacacaa tacagaaccc    6420
cggctgctat cacaactgtg ctccagcagc ttgaaagatg gatccctcga aattcttcac    6480
aatatcggac aatgccacct ttgcacctgg gcctgttatc aatgcagctg acaagaagac    6540
attccgaacc tgcttccgaa tattggtatt gtctgtacaa gctgttaccc ttatattagt    6600
cattgtcact ttaggtgagc ttgtgaggat gatcaatgat caaggcttga gtaatcagtt    6660
gtcttcaatt acaaacaaga taagagagtc agctactatg attgcatctg ctgtgggagt    6720
```

```
aatgaatcaa gttattcacg gagtaacgat atccttaccc ctacaaattg agggaaacca    6780
aaatcaattg ttatccacac ttgccacaat ctgtacaagc aaaaaacaag tctcaaactg    6840
ctctacgaac atccccttag ttaatgacct taggtttata aatgggatca ataaattcat    6900
cattgaagat tatgcaactc atgatttctc tatcggccat ccactcaaca tgcctagctt    6960
tatcccaact gcaacttcac ccaatggttg cacaaggatt ccatccttct ctctaggtaa    7020
gacacactgg tgttacacac ataatgtaat taatgccaac tgtaaggatc atacttcgtc    7080
taaccaatat gtttctatgg ggattctcgt tcagaccgcg tcagggtatc ctatgttcaa    7140
aaccttaaaa atccaatatc tcagtgatgg cctgaatcgg aaaagctgct caattgcaac    7200
agtccctgat ggatgcgcaa tgtattgtta cgtctcaact cagcttgaaa ccgacgacta    7260
tgcagggttc agcccaccta cccagaaact taccctgtta ttctataatg acccgtcac    7320 agaacggaca atatctccat ctggtcttga agggaattgg gctactttgg taccaggagt    7380
ggggagtgga atatatttcg agaataaatt gatctttcct gcatatgggg gtgtcttgcc    7440
caatagtaca cttggagtta atcagcaag agaattttc cgacctgtta atccatataa    7500
tccatgttca ggaccacaac aagatttaga tcagcgtgct ttgagatcat acttcccaag    7560
ttacttctct aatcgaagag tgcagagtgc atttcttgtc tgtgcctgga accagatcct    7620
agttacaaat tgcgagctag ttgtcccctc aaacaatcag acactgatgg gtgcagaagg    7680
aagagtttta ttgatcaata atcgattatt atattatcag agaagtacca gctggtggcc    7740
gtatgaactc ctctatgaga tgtcattcac ctttacaaac tctggtcaat catctgtgaa    7800
catgtcctgg atacctatat actcattcac tcgtcctggt tcaggtaact gcagtggtga    7860
aaatgtgtgc ccgactgctt gtgtgtcagg ggtttatctt gacccttggc cattaactcc    7920
atatagccac caatcaggca ttaacagaaa tttctatttc acaggtgcac tattaaattc    7980
aagcacaact agagtaaatc ctacccttta tgtctctgcc cttaataatc ttaaagtact    8040
agccccatat ggtactcaag gactgtttgc ctcgtacacc acaaccacct gctttcaaga    8100
taccggtgat gctagtgtat attgtgttta tattatggaa ctagcatcga atatcgttgg    8160
agaattccaa atcctacctg tgctaaccag actgaccatc acttgagtca tagtgaatgc    8220
agcggtaggc cctatgggcg tgtcccaagt tttatcgatt attaagaaaa accaggccag    8280
aatggcgggc ctaaatgaga tactcttacc tgaagtacat ttgaactcac ccatcgttag    8340
atataagctt ttctactata tattgcatgg ccagttacca aatgatttgg agccagatga    8400
cttgggccca ctagcaaatc agaattggaa ggcaattcga tctgaagaat ctcaggttca    8460
tgcacgttta aaacagatca gagtagaact cattgcaagg attcctagtc tccggtggac    8520
ccgctctcaa agagagattg ccatactcat ttggccaaga atacttccaa tcctgcaagc    8580
atatgatctt cggcaaagta tgcaattgcc tacagcatgg agaaattga ctcaatccac    8640 agttaatctt ataagtgatg gcctggaacg ggttgtatta catatcagca atcaactgac    8700
aggcaagcct aacttgtttta ccagatctcg agcaggacaa gacgcaaagg attcctcaat    8760
tccatccact agagagctat ctcaaatatg gtttaacaat gagtggagtg gatctgtaaa    8820
gacctggctt atgattaaat atagaatgag gcagctaatc acaaaccaaa agacaggtga    8880
attaacagat ttagtaacca ttgtggatac tagatccact ctatgcatta ttaccccaga    8940
attagttgct ttatactcca atgagcacaa agcattaacg tacctcacct ttgaaatggt    9000
cttaatggtc actgatatgt tagagggacg actgaatgtt tcttctttat gcactgctag    9060
```

```
tcattatctg tctcctctaa agaagagaat cgaaattctt ctaacattag ttgatgacct    9120
tgctctactc atgggggaca aagtatacgg tgttgtctct tcacttgaga gttttgttta    9180
tgcccaatta cagtatggtg atcctgttgt agacattaag ggcacattct atggatttat    9240
atgtaatgag attctcgacc tactgactga agacaacatc tttactgaag aggaggcaaa    9300
caaggttctt ctggacttga catcacagtt tgacaattta tccctgatt taactgctga     9360
gctcctctgc attatgagac tttggggcca tcccacatta accgccagcc aagcagcatc    9420
caaggtccga gagtccatgt gtgctcccaa ggtattagat ttccaaacaa taatgaagac    9480
cctggctttc tttcacgcaa tcctgattaa cggttatagg aggagccata atggaatctg    9540
gcctcctact actcttcatg gcaatgcccc caaaagcctc attgagatgc gtcatgataa    9600
ctcagagctt aagtatgaat atgtcctcaa gaattggaaa agtatatcta tgttaaggat    9660
acataaatgc tttgatgcat cacctgatga agatctcagc atattcatga aggatagggc    9720
aataagctgt ccaaagcaag actgatgggt agtatttagg aggagcctga taaaacagcg    9780
atatcgtgat gcgaatcgac ctctaccaca accattcaac cgacggctac tgttgaattt    9840
tctagaagat gacagattcg atcctattaa agaacttgag tatgtcacca gtggagaata    9900
tcttagggac cctgaatttt gtgcatctta ctctctcaag gagaaggaga taaaggctac    9960
aggtcgtata tttgctaaaa tgacaaagag aatgagatcg tgccaagtaa ttgcagagtc   10020
attgttggcc aatcatgcag gaaaattaat gagagagaat ggagttgtct tagaccagtt   10080
aaaactgaca aaatctttgt taacgatgaa ccaaattggt attatatcgg agcacagccg   10140
aagatccact gctgacaaca tgactttggc acactccggt tcaaataagc acagaattaa   10200
taatagccaa ttcaagaaaa ataaagacaa taaacatgag atgcctgatg atgggtttga   10260
gatagcagcc tgcttttctaa caactgacct cacaaagtac tgcttaaatt ggaggtacca   10320
agttatcatc cccttttgcgc gtacattgaa ctcaatgtat ggtataccccc atctgttcga   10380
atggatacat ttaaggctaa tgcgaagcac tctctatgtc ggtgatccct tcaatcctcc   10440
atcagatcct acccaacttg accttgatac agctctcaac gatgatatat ttatagtttc   10500
ccctcgtgga ggaatcgagg gtttatgtca aaaattatgg actatgattt ccatctcaac   10560
aattatatta tccgcaactg aggctaacac tagagttatg agcatggttc agggtgacaa   10620
ccaagcaatt gcaatcacca ctagagtagt acgctcgctc agtcattccg agaagaagga   10680
gcaagcttat aaagcgagta aattattctt tgaaaggctt agagctaaca accatggaat   10740
tggacaccac ttaaaagaac aagaaacaat ccttagttct gatttcttca tatatagtaa   10800
gagggtgttt tacaaaggtc gaattttgac tcaggcgtta agaatgtgaa gcaagatgtg   10860
cttaacagct gatatactgg gggactgctc acaagcatca tgctccaatt tagccactac   10920
tgtaatgcgc ctgactgaga atggggtcga gaaagatttg tgttattttc taaatgcatt   10980
catgacaatc agacaattgt gttatgatct agtatttccc caaactaaat ccctagtca   11040
ggacatcact aatgcttatc tcaatcatcc aatacttatc tcaagattgt gtctattacc   11100
atctcaattg gggggactga actttctctc gtgtagtcgc ctgttcaata gaaacatagg   11160
agacccatta gtgtctgcaa ttgctgatgt gaaacgatta attaaagctg gctgtttaga   11220
catctgggtc ttgtataaca ttcttggaag aagacctggg aaaggtaagt ggagcactct   11280
ggcagctgat ccctatactt taaacataga ttatttagtt ccttcaacaa cttttttaaa   11340
gaagcatgca caatatacat tgatggaacg gagtgttaat cccatgctcc gtggagtatt   11400
cagtgagaat gcagctgagg aagaggagga actcgcacag tatctcttag atcgtgaggt   11460
```

```
agtcatgccc agggttgcac atgtaatact tgcccagtct agttgcggta gaagaaagca   11520
gattcaaggt tacttggatt ccactaggac tattatcagg tattcattgg aggtgagacc   11580
attgtcagca aagaagctga atacagttat agaatataac ttattgtatc tgtcctataa   11640
tttggagatt attgaaaaac ccaatatagt ccagccattt ttgaatgcaa tcaatgttga   11700
tacttgtagc atagatatag ctaggtccct tagaaaacta tcctgggcaa ctttacttaa   11760
tggacgtccc atcgagggat tagaaacacc tgatcccatt gaattggtac atgggtgtct   11820
gataattggg tcagatgaat gtgagcattg cagtagtggt gatgacaagt ttacctggtt   11880
tttcctaccc aaggggataa ggctagataa tgacccggcg tccaacccac ccatcagagt   11940
accttatatt ggatctaaaa cagatgagcg gagggttgcg tcaatggctt acatcaaagg   12000
agcatctgta tcacttaaat cagcactcag gttagcgggg gtatatattt gggccttcgg   12060
agatacagaa gaatcatggc aagatgccta tgagttagcc tccactcgtg tcaatctcac   12120
gctagagcaa ttgcaatctc tcactccttt gccaacatct gccaacctag tccacaggtt   12180
ggatgatggc actactcaat taaaatttac cccggcaagc tcttatgcat tctctagctt   12240
tgtgcatata tctaatgact gtcaagttct tgagatcgat gatcaggtaa cagattctaa   12300
cctgatttac caacaagtta tgattactgg ccttgcttta attgagacat ggaacaatcc   12360
tccaattaac ttctccgttt atgaaactac actacaccta cacacaggct catcttgctg   12420
tataagacct gttgagtctt gtgtagtaaa tcctcctttg cttcctgtcc ccttcatcaa   12480
tgttcttcaa atgaataagt ttgtatatga ccctgaacca ctcagtttgc tagagatgga   12540
aaaaattgag gatattgctt atcaaaccag aattggtggt ttagatcaaa tcccacttct   12600
ggaaaaaata cccttactag ctcacctcac cgccaagcag atggtaaata gcatcactgg   12660
gcttgatgaa gcaacatcta tagtgaatga cgctgtagtt caagcagact atactagcaa   12720
ttggattagt gaatgctgct acacttacat tgattctgtg tttgtttatt ctggctgggc   12780
attattattg gaactttcgt accaaatgta ctacttaaga attcaaggca tccaaggaat   12840
tctagactat gtgtatatga ccttgcggag gatacctgga atggctataa caggcatctc   12900
atccacaatc agtcaccctc gtatactcag aagatgcata aatttggatg tcatagcccc   12960
aatcaattct ccacacatag cttcactgga ttacacaaaa ttaagcatag atgcagtaat   13020
gtggggaact aagcaagttt tgaccaacat ttcgcaaggt atcgattatg agatagtcgt   13080
tccttctgaa agccagctca cactcagtga tagagttcta aatctagttg ctcgaaaatt   13140
atcactactt gcaatcatct gggcaaatta taactatcct ccaaaggtta aaggtatgtc   13200
acctgaggac aaatgtcagg ctttaactac acacctactc cagactgtcg agtatgttga   13260
gcacattcag attgaaaaga caaacatcag gaggatgatt attgaaccaa aattaactgc   13320
ctaccctagt aatttgtttt atctatctcg aaagctgctt aatgctatta gagattctga   13380
agaaggacaa ttcctgattg catcttatta taacagtttt ggatatttgg agccaatact   13440
aatggaatct aaaatattca atctaagttc atctgaatcg gcatctctta cagagttcga   13500
tttcatcctc aacttggaat tgtctgaaac cagccttgag aaatactctc tcccaagttt   13560
gcttatgacg gctgagaata tggataaccc atttcctcaa ccccccttc atcatgttct   13620 cagaccatta ggtttatcat ccacctcatg gtataaaaca atcagtgttt tgaattatat   13680
tagccatatg aagatatccg acggtgccca tctatacttg gcagagggga gtggagcctc   13740
tatgtcactt atagagactt tcttgcccgg tgaaacaata tggtacaaca gcctattcaa   13800
```

| | |
|---|---|
| tagtggtgag aatcctcccc aacgcaattt cgccccttig cccacccagt ttattgaaag | 13860 |
| tgtcccttac agattgattc aagcaggtat agcagcagga agtggtgtag tgcaaagttt | 13920 |
| ctatccactc tggaacggta acagcgatac cactgactta agcacgaaaa ctagtgtcga | 13980 |
| atacattatt cacaaggtgg gagcggatac atgtgcattg gttcatgtgg atttggaggg | 14040 |
| tgtacccggt tcaatgaata gcatgctgga gagagcccaa gtacatgcgc tactgatcac | 14100 |
| ggtaactgta ttaaagccag gtggcttgct aatcttgaaa gcttcatggg aaccttttaa | 14160 |
| tcgattttcc ttttactca caatcctctg gcaattcttt tcaacaataa ggatcctgcg | 14220 |
| atcttcatac tctgacccga ataatcacga ggtatacata atagctacat tagcagttga | 14280 |
| tcccaccaca tcctccttta caactgctct gaatagggcg cgcaccctaa atgaacaggg | 14340 |
| cttttcactc atcccacctg aattagtgag tgagtactgg aggaggcgcg ttgaacaagg | 14400 |
| gcaaattata caggatcgta tagataaagt catatcggaa tgtgtcagag accaatacct | 14460 |
| ggcagataac aacattatcc ttcaggcagg aggaactcca agcacaagaa atggttgga | 14520 |
| tctacctgac tatccgtcgt tcaatgaatt acaatcggag atggcagac tcataacaat | 14580 |
| tcatctcaaa gagataatag aaatcctaaa aggccaatca tcagatcatg acaccttatt | 14640 |
| atttacttcg tacaatgtag gtcccctcgg gaaaataaat acaatactca gattgattgt | 14700 |
| tgagagaatt cttatgtaca ctgtaaggaa ctggtgcatc ttgcccaccc aaactcgtct | 14760 |
| caccttacga cagtctatcg agcttggaga gtttagacta agagacgtga taacacccat | 14820 |
| ggagatcctt aagctatccc ccaacaggaa gtatctgaag tctgcattaa accaatcaac | 14880 |
| attcaatcat ctaatggggg aaacatctga catattgtta aatcgagcct atcagaagag | 14940 |
| aatttggaaa gccattggat gtgtaatcta ttgctttggt ttgcttaccc cggatgttga | 15000 |
| agattccgag cgcattgata ttgataatga tatacctgat tatgatattc acggggacat | 15060 |
| aatttaaatc tgttaaagac tcctctggta tgatacatca ccaaaaggtg ccacaccagc | 15120 |
| atcccaattc ttctagaccg cacacgacct cgaacaatca taaccacatc agtattaaat | 15180 |
| ccataatatc atttaagaa aaaattgatt ttactttctc cccttggt | 15228 |

```
<210> SEQ ID NO 4
<211> LENGTH: 22
<212> TYPE: DNA
<213> ORGANISM: Artificial sequence
<220> FEATURE:
<223> OTHER INFORMATION: Primer

<400> SEQUENCE: 4
accaagggga aaatgaagat gg                                                 22

<210> SEQ ID NO 5
<211> LENGTH: 22
<212> TYPE: DNA
<213> ORGANISM: Artificial sequence
<220> FEATURE:
<223> OTHER INFORMATION: Primer

<400> SEQUENCE: 5
gggcctgtga atccatttgt tc                                                 22

<210> SEQ ID NO 6
<211> LENGTH: 22
<212> TYPE: DNA
<213> ORGANISM: Artificial sequence
<220> FEATURE:
<223> OTHER INFORMATION: Primer
```

<400> SEQUENCE: 6
tggaatcctg cacctccatc tt                                              22

<210> SEQ ID NO 7
<211> LENGTH: 22
<212> TYPE: DNA
<213> ORGANISM: Artificial sequence
<220> FEATURE:
<223> OTHER INFORMATION: Primer

<400> SEQUENCE: 7
ggaatgatgg cgaccgtaaa ga                                              22

<210> SEQ ID NO 8
<211> LENGTH: 22
<212> TYPE: DNA
<213> ORGANISM: Artificial sequence
<220> FEATURE:
<223> OTHER INFORMATION: Primer

<400> SEQUENCE: 8
gaatgacaca tctcctggtc ca                                              22

<210> SEQ ID NO 9
<211> LENGTH: 22
<212> TYPE: DNA
<213> ORGANISM: Artificial sequence
<220> FEATURE:
<223> OTHER INFORMATION: Primer

<400> SEQUENCE: 9
catccaccaa tcatcaccat cg                                              22

<210> SEQ ID NO 10
<211> LENGTH: 22
<212> TYPE: DNA
<213> ORGANISM: Artificial sequence
<220> FEATURE:
<223> OTHER INFORMATION: Primer

<400> SEQUENCE: 10
gtcatcagtt tttgcgagtg at                                              22

<210> SEQ ID NO 11
<211> LENGTH: 22
<212> TYPE: DNA
<213> ORGANISM: Artificial sequence
<220> FEATURE:
<223> OTHER INFORMATION: Primer

<400> SEQUENCE: 11
agtcaaaact atgccttgca gg                                              22

<210> SEQ ID NO 12
<211> LENGTH: 22
<212> TYPE: DNA
<213> ORGANISM: Artificial sequence
<220> FEATURE:
<223> OTHER INFORMATION: Primer

<400> SEQUENCE: 12
cgttagactt cgacagtttg ca                                              22

<210> SEQ ID NO 13

```
<211> LENGTH: 21
<212> TYPE: DNA
<213> ORGANISM: Artificial sequence
<220> FEATURE:
<223> OTHER INFORMATION: Primer

<400> SEQUENCE: 13
cttgccacaa tctgtacaag c                                              21

<210> SEQ ID NO 14
<211> LENGTH: 22
<212> TYPE: DNA
<213> ORGANISM: Artificial sequence
<220> FEATURE:
<223> OTHER INFORMATION: Primer

<400> SEQUENCE: 14
gtggatggcc gatagagaaa tc                                             22

<210> SEQ ID NO 15
<211> LENGTH: 22
<212> TYPE: DNA
<213> ORGANISM: Artificial sequence
<220> FEATURE:
<223> OTHER INFORMATION: Primer

<400> SEQUENCE: 15
tgaatgcagc ggtaggccct at                                             22

<210> SEQ ID NO 16
<211> LENGTH: 22
<212> TYPE: DNA
<213> ORGANISM: Artificial sequence
<220> FEATURE:
<223> OTHER INFORMATION: Primer

<400> SEQUENCE: 16
atatctaacg atgggtgagt tc                                             22

<210> SEQ ID NO 17
<211> LENGTH: 25
<212> TYPE: DNA
<213> ORGANISM: Artificial sequence
<220> FEATURE:
<223> OTHER INFORMATION: Primer

<400> SEQUENCE: 17
gtatgaatat gtcctcaaga attgg                                          25

<210> SEQ ID NO 18
<211> LENGTH: 22
<212> TYPE: DNA
<213> ORGANISM: Artificial sequence
<220> FEATURE:
<223> OTHER INFORMATION: Primer

<400> SEQUENCE: 18
cagtcttgct ttggacagct ta                                             22

<210> SEQ ID NO 19
<211> LENGTH: 23
<212> TYPE: DNA
<213> ORGANISM: Artificial sequence
<220> FEATURE:
<223> OTHER INFORMATION: Primer

<400> SEQUENCE: 19
```

```
ccaaactaaa tcccttagtc agg                                            23

<210> SEQ ID NO 20
<211> LENGTH: 22
<212> TYPE: DNA
<213> ORGANISM: Artificial sequence
<220> FEATURE:
<223> OTHER INFORMATION: Primer

<400> SEQUENCE: 20
caggcgacta cacgagagaa ag                                             22

<210> SEQ ID NO 21
<211> LENGTH: 22
<212> TYPE: DNA
<213> ORGANISM: Artificial sequence
<220> FEATURE:
<223> OTHER INFORMATION: Primer

<400> SEQUENCE: 21
gctgtataag acctgttgag tc                                             22

<210> SEQ ID NO 22
<211> LENGTH: 22
<212> TYPE: DNA
<213> ORGANISM: Artificial sequence
<220> FEATURE:
<223> OTHER INFORMATION: Primer

<400> SEQUENCE: 22
tccatctcta gcaaactgag tg                                             22

<210> SEQ ID NO 23
<211> LENGTH: 22
<212> TYPE: DNA
<213> ORGANISM: Artificial sequence
<220> FEATURE:
<223> OTHER INFORMATION: Primer

<400> SEQUENCE: 23
agaatcctcc ccaacgcaat tt                                             22

<210> SEQ ID NO 24
<211> LENGTH: 22
<212> TYPE: DNA
<213> ORGANISM: Artificial sequence
<220> FEATURE:
<223> OTHER INFORMATION: Primer

<400> SEQUENCE: 24
ctgttaccgt tccagagtgg at                                             22

<210> SEQ ID NO 25
<211> LENGTH: 22
<212> TYPE: DNA
<213> ORGANISM: Artificial sequence
<220> FEATURE:
<223> OTHER INFORMATION: Primer

<400> SEQUENCE: 25
accaagggga gaaagtaaaa tc                                             22

<210> SEQ ID NO 26
<211> LENGTH: 64
<212> TYPE: DNA
```

```
<213> ORGANISM: Artificial sequence
<220> FEATURE:
<223> OTHER INFORMATION: Primer

<400> SEQUENCE: 26
tgcaggcggc cgcgtaatac gactcactat agggaccaag gggaaaatga agatgggata    60
ttgg                                                                 64

<210> SEQ ID NO 27
<211> LENGTH: 42
<212> TYPE: DNA
<213> ORGANISM: Artificial sequence
<220> FEATURE:
<223> OTHER INFORMATION: Primer

<400> SEQUENCE: 27
ataagaatgc ggccgcggtc accatgctgc cctgtgcaag ca                       42

<210> SEQ ID NO 28
<211> LENGTH: 33
<212> TYPE: DNA
<213> ORGANISM: Artificial sequence
<220> FEATURE:
<223> OTHER INFORMATION: Primer

<400> SEQUENCE: 28
ttggcgcgcc agcatggtga cccaaataaa gaa                                 33

<210> SEQ ID NO 29
<211> LENGTH: 37
<212> TYPE: DNA
<213> ORGANISM: Artificial sequence
<220> FEATURE:
<223> OTHER INFORMATION: Primer

<400> SEQUENCE: 29
ctcgcggacc gccggattaa ttaattgggg ctgaaac                             37

<210> SEQ ID NO 30
<211> LENGTH: 33
<212> TYPE: DNA
<213> ORGANISM: Artificial sequence
<220> FEATURE:
<223> OTHER INFORMATION: Primer

<400> SEQUENCE: 30
ttggcgcgcc caattaatta atccggcact gtc                                 33

<210> SEQ ID NO 31
<211> LENGTH: 42
<212> TYPE: DNA
<213> ORGANISM: Artificial sequence
<220> FEATURE:
<223> OTHER INFORMATION: Primer

<400> SEQUENCE: 31
ataagaatgc ggccgccagc cagctttaat taatcgtttc ac                       42

<210> SEQ ID NO 32
<211> LENGTH: 34
<212> TYPE: DNA
<213> ORGANISM: Artificial sequence
<220> FEATURE:
<223> OTHER INFORMATION: Primer

<400> SEQUENCE: 32
```
ttggcgcgcc gattaattaa agctggctgt ttag                34

<210> SEQ ID NO 33
<211> LENGTH: 39
<212> TYPE: DNA
<213> ORGANISM: Artificial sequence
<220> FEATURE:
<223> OTHER INFORMATION: Primer

<400> SEQUENCE: 33
ataagaatgc ggccgcccca tgaagctttc aagattagc          39

<210> SEQ ID NO 34
<211> LENGTH: 32
<212> TYPE: DNA
<213> ORGANISM: Artificial sequence
<220> FEATURE:
<223> OTHER INFORMATION: Primer

<400> SEQUENCE: 34
ttggcgcgcc ttgaaagctt catgggaacc tt                 32

<210> SEQ ID NO 35
<211> LENGTH: 60
<212> TYPE: DNA
<213> ORGANISM: Artificial sequence
<220> FEATURE:
<223> OTHER INFORMATION: Primer

<400> SEQUENCE: 35
ggtcggaccg cgaggaggtg gagatgccat gccgacccac caaggggaga agtaaaatc    60

<210> SEQ ID NO 36
<211> LENGTH: 39
<212> TYPE: DNA
<213> ORGANISM: Artificial sequence
<220> FEATURE:
<223> OTHER INFORMATION: Primer

<400> SEQUENCE: 36
ataagaatgc ggccgcctag cataacccct tggggcctc          39

<210> SEQ ID NO 37
<211> LENGTH: 36
<212> TYPE: DNA
<213> ORGANISM: Artificial sequence
<220> FEATURE:
<223> OTHER INFORMATION: Primer

<400> SEQUENCE: 37
ttggcgcgcc tgcagctggc gccatcgata cgcgta             36

<210> SEQ ID NO 38
<211> LENGTH: 26
<212> TYPE: DNA
<213> ORGANISM: Artificial sequence
<220> FEATURE:
<223> OTHER INFORMATION: Primer

<400> SEQUENCE: 38
acagacaaat gcacgtgcga tagcgg                        26

<210> SEQ ID NO 39
<211> LENGTH: 37
<212> TYPE: DNA

```
<213> ORGANISM: Artificial sequence
<220> FEATURE:
<223> OTHER INFORMATION: Primer

<400> SEQUENCE: 39
tttctagcta gctgccggca tagtgcaacg gcagggt                              37

<210> SEQ ID NO 40
<211> LENGTH: 35
<212> TYPE: DNA
<213> ORGANISM: Artificial sequence
<220> FEATURE:
<223> OTHER INFORMATION: Primer

<400> SEQUENCE: 40
ccggcagcta gctagaaaga tctccaaccc ggaca                                35

<210> SEQ ID NO 41
<211> LENGTH: 31
<212> TYPE: DNA
<213> ORGANISM: Artificial sequence
<220> FEATURE:
<223> OTHER INFORMATION: Primer

<400> SEQUENCE: 41
atttgctagt gggcccaagt catctggctc c                                    31

<210> SEQ ID NO 42
<211> LENGTH: 18
<212> TYPE: DNA
<213> ORGANISM: Mumps virus

<400> SEQUENCE: 42
agagaggagg gccgggag                                                   18

<210> SEQ ID NO 43
<211> LENGTH: 21
<212> TYPE: DNA
<213> ORGANISM: Mumps virus

<400> SEQUENCE: 43
ctatgccggc agctagctag a                                               21

<210> SEQ ID NO 44
<211> LENGTH: 17
<212> TYPE: DNA
<213> ORGANISM: Mumps virus

<400> SEQUENCE: 44
ctatgccggc agctagc                                                    17

<210> SEQ ID NO 45
<211> LENGTH: 22
<212> TYPE: DNA
<213> ORGANISM: Mumps virus

<400> SEQUENCE: 45
actatgccgg cagctagcta ga                                              22
```

F-GENOTYPE MUMPS VIRUS ATTENUATED STRAIN AND CONSTRUCTION METHOD THEREFOR AND APPLICATION THEREOF

The Sequence Listing file named "P2022-0597.Sequence listing-Amended.txt" created on Jun. 25, 2025, and having a size of 28,323 bytes is incorporated herein by reference.

TECHNICAL FIELD

The present invention relates to the field of bioengineering technology, in particular to an F-genotype mumps virus attenuated strain and the preparation method and application thereof.

BACKGROUND

The mumps is an acute infectious disease caused by the mumps virus. Before the middle of the 20th century, it was one of the infectious diseases that seriously endangered the health of children and adolescents. The clinical symptoms of mumps are mainly parotid swelling and pain, often secondary to encephalitis and reproductive system inflammation, etc., and severe patients may die. This disease has become one of the six major causes of infertility in China.

Since the 1960s, with the successful development and wide-ranging use of live attenuated mumps vaccines, the incidence of mumps in most countries around the world, including China, has dropped sharply and remained at a low level for a long time (less than one in 100,000). However, since the 1990s, the incidence of mumps has gradually increased in many countries (especially European and East Asian countries), and the incidence of mumps has not been effectively controlled even if the mumps vaccines is widely boosted. Taking China as an example, although the country included the measles-mumps-rubella triple vaccine in expanded immunization program in 2008, local outbreaks of mumps still occur every year, and the incidence rate increases year by year.

In view of the current severe prevention and control situation of mumps, virologists from all over the world and WHO have done a lot of work to explore its causes, and a recognized research result has been obtained: cross-protection between mumps viruses of different genotypes cannot be completely realized. Although there is only one serotype of mumps virus, there are 11 different genotypes. In the 20th century, the predominant type of mumps genotype around the world was A genotype. However, in the past 20 years, the dominant epidemic strains in most countries are non-A genotype viruses: for example, in Europe and the United States, G genotype viruses are mainly dominated, accompanied by H and D genotypes; in China, F genotype strains account for the vast majority, while G genotype viruses account for only a small proportion.

In conclusion, it is of great significance and urgency to develop a more effective mumps vaccine for a new genotype.

At present, all mumps vaccines in the world are A genotype, which are produced by using traditional weakening methods. The cell matrix for production is primary chicken embryo fibroblasts.

The weakening methods of traditional live attenuated mumps vaccines are achieved by continuous passage under non-optimal conditions. The specific process is to first expand in the primary or passage cells, and then continue to passaging and weakening in primary chicken embryo fibroblasts. There are two disadvantages: first, the success rate is low, because the virus may fail to be weakened, and the immunogenicity may also decrease with the weakening of virulence; second, the end point of weakening is not easy to judge. Therefore, in order to prevent the vaccine from returning to strong virulence, the virus generation of traditional live attenuated mumps vaccine has been limited to a very narrow range. Moreover, for weakening method of traditional live attenuated mumps vaccine, the weakening principle of it cannot be explained, so a long time and a large number of evaluation tests are required to determine the safety and genetic stability of the new vaccine strain, therefore the vaccine development cycle is very long.

Compared with the traditional mumps virus live vaccine weakening technology, the new mumps virus weakening strategy is mainly through reverse genetic operation technology, based on the systematic and clear viral protein function research, which directly delete the virus's virulence-related genes so as to obtain an attenuated mumps vaccine strain with a clear weakening mechanism. In virology research, it is an effective preparation strategy for new attenuated live vaccine by mutating or deleting virulence-related genes to obtain candidate vaccine strains with weakened virulence and stable immunogenicity.

So far, there are few studies on the live attenuated mumps vaccine of F genotype (the dominant epidemic strain in China), and only its growth characteristics on Vero cells have been verified, which does not have the ability to carry out production according to the requirements of the Chinese pharmacopoeia. It should be noted that the global live attenuated mumps vaccines are all produced in primary chicken embryo fibroblasts. If other cell matrices are used, a lot of research on technology and quality control needs to be completed, and the research and development period will be very long.

Therefore, there is an urgent need in the art to develop an effective and efficient preparation technology for the F genotype mumps live attenuated vaccine that can be prepared and produced on a large scale in primary chicken embryo fibroblasts with high safety.

SUMMARY OF THE INVENTION

The purpose of the present invention is to provide an effective and efficient preparation technology for the F genotype mumps live attenuated vaccine that can be prepared and produced on a large scale in primary chicken embryo fibroblasts with high safety.

In the first aspect of the present invention, it provides an F genotype mumps virus attenuated strain, and the attenuated strain is mumps virus QS-F-SH2 with an accession number of CCTCC NO: V201950.

In the second aspect of the present invention, it provides a derived virus strain derived from the F genotype mumps virus attenuated strain according to the first aspect of the present invention, with one or more of the following characteristics:

(a) it is suitable for passage in primary cultured cells of chicken embryos, with a stable passage number ≥10, preferably, a stable passage number ≥15, and more preferably, a stable passage number ≥30;

(b) low virulence: the virulence index is equivalent to the virulence index of the mumps virus QS-F-SH2 whose accession number is CCTCC NO: V201950; wherein, the virulence index is equivalent means that its virulence index is ≤150%, preferably ≤120%, more preferably ≤100% of the virulence index of the mumps virus QS-F-SH2 whose accession number is CCTCC NO: V201950; wherein, the virulence index is the degree of causing hydrocephalus;

(c) compared with wild-type F genotype mumps virus, SH gene is deleted and only SH gene is deleted in the genome.

In another preferred embodiment, the genome of the derived virus strain contains the following nucleotide sequences:

(i) the nucleotide sequence shown in SEQ ID NO: 1 corresponding to the SH gene in the genome of the wild-type F genotype mumps virus is replaced by the nucleotide sequence shown in SEQ ID NO: 2; and (ii) the sequence identity to the nucleotide sequence shown in SEQ ID NO: 3 is ≥85%, preferably ≥90%, more preferably ≥95%.

In another preferred embodiment, the genome of the derived virus strain contains the following nucleotide sequences:

(i) the nucleotide sequence shown in SEQ ID NO: 1 corresponding to the SH gene in the genome of the wild-type F genotype mumps virus is replaced by the nucleotide sequence shown in SEQ ID NO: 2; and (ii) the sequence identity to the nucleotide sequence shown in SEQ ID NO: 3 is ≥85%, ≥86%, ≥87%, ≥88%, ≥89%, ≥90%, ≥91%, ≥92%, ≥93%, ≥94%, ≥95%, ≥96%, ≥97%, ≥98%, or ≥99%.

In another preferred embodiment, the genome of the derived virus strain contains the nucleotide sequences shown in SEQ ID NO: 3.

In the third aspect of the present invention, it provides a vaccine composition, which comprises:

(i) the F genotype mumps virus attenuated strain according to the first aspect of the present invention or the derived virus strain according to the second aspect of the present invention; and (ii) a vaccine acceptable carrier.

In another preferred embodiment, the carrier is a pharmaceutically acceptable carrier.

In another preferred embodiment, the pharmaceutically acceptable carrier contains liquid, preferably water, saline or buffer.

In another preferred embodiment, the carrier further contains an auxiliary substance, preferably a filler, a lubricant, a glidant, a wetting agent or an emulsifier, a pH buffer substance, etc.

In another preferred embodiment, the carrier further contains a cell transfection agent.

In another preferred embodiment, the vaccine composition is a dual vaccine or a multiple vaccine.

In another preferred embodiment, the vaccine composition further contains one or more vaccine components derived from pathogens selected from the group consisting of: measles, rubella, Japanese encephalitis, hepatitis A, chickenpox, polio, and a combination thereof.

In another preferred embodiment, the vaccine component comprises an inactivated strain, an attenuated strain, or a protein, a nucleic acid, etc.

In another preferred embodiment, the vaccine composition further comprises an adjuvant.

In another preferred embodiment, the adjuvant comprises a granular and non-granular adjuvant.

In another preferred example, the granular adjuvant is selected from the group consisting of: aluminum salts, water-in-oil emulsions, oil-in-water emulsions, nanoparticles, micro-particles, liposomes, immunostimulatory complexes, and a combination thereof.

In another preferred embodiment, the non-granular adjuvant is selected from the group consisting of muramyl dipeptide and its derivatives, saponins, lipid A, cytokines, derived polysaccharides, bacterial toxins, microorganisms and their products such as mycobacteria (*Mycobacterium tuberculosis*, BCG), *Bacillus pumilus, Bacillus* pertussis, propolis, and a combination thereof.

In another preferred embodiment, the virus in each dose of the vaccine composition is at least 3.7 $lgCCID_{50}$.

In another preferred embodiment, the vaccine composition is in the form of injection.

In the fourth aspect of the present invention, it provides a method for preparing the F genotype mumps virus attenuated strain, which comprises the steps:

(i) constructing a full-length recombinant plasmid of the F genotype mumps virus that lacks and only lacks the SH gene;

(ii) obtaining three helper plasmids containing the N gene, P gene and L gene in the mumps virus, respectively; and (iii) co-transfecting host cells with the full-length recombinant plasmid obtained in (i) and the three helper plasmids, and after culturing for 3 days, lysing the cells and inoculating into the new cells for culture, and when the cytopathy can be observed, the F genotype mumps virus attenuated strain is obtained.

In another preferred embodiment, the host cell is selected from the group consisting of BSR-T7 cells, 293T cells, Vero cells, Slam/Vero cells, and a combination thereof.

In the fifth aspect of the present invention, it provides the use of the F genotype mumps virus attenuated strain according to the first aspect of the present invention or the derived virus strain according to the second aspect of the present invention for the preparation of a vaccine composition for preventing mumps.

In another preferred embodiment, the mumps is F genotype mumps.

In the sixth aspect of the present invention, it provides a method for preparing a vaccine composition, which comprises the steps:

(i) passaging or culturing the mumps virus QS-F-SH2 with a deposit number of CCTCC NO: V201950 to obtain an attenuated vaccine strain;

(ii) mixing the attenuated vaccine strain prepared in step (i) with an immunoacceptable carrier to produce the vaccine composition.

In the seventh aspect of the present invention, it provides a method for inoculating against mumps, comprising the step of: inoculating the F genotype mumps virus attenuated strain according to the first aspect of the present invention or the derived virus strain according to the second aspect of the present invention, or the vaccine composition according to the third aspect of the present invention to a subject in need.

In another preferred embodiment, the subject is a mumps susceptible person over 8 months of age.

In another preferred embodiment, the method for inoculating includes subcutaneous injection inoculation.

In another preferred embodiment, the dose of the inoculation is not less than 3.7 $lgCCID_{50}$.

It should be understood that within the scope of the present invention, each technical features of the present invention described above and in the following (as examples) may be combined with each other to form a new or preferred technical solution, which is not listed here due to space limitations.

Wherein, A shows the sequencing results of rMuV-ΔSHΔV related sites; B shows the sequencing results of rMuV-ΔSH related sites; C shows the sequencing results of rMuV-ΔV related sites.

Figure 5:
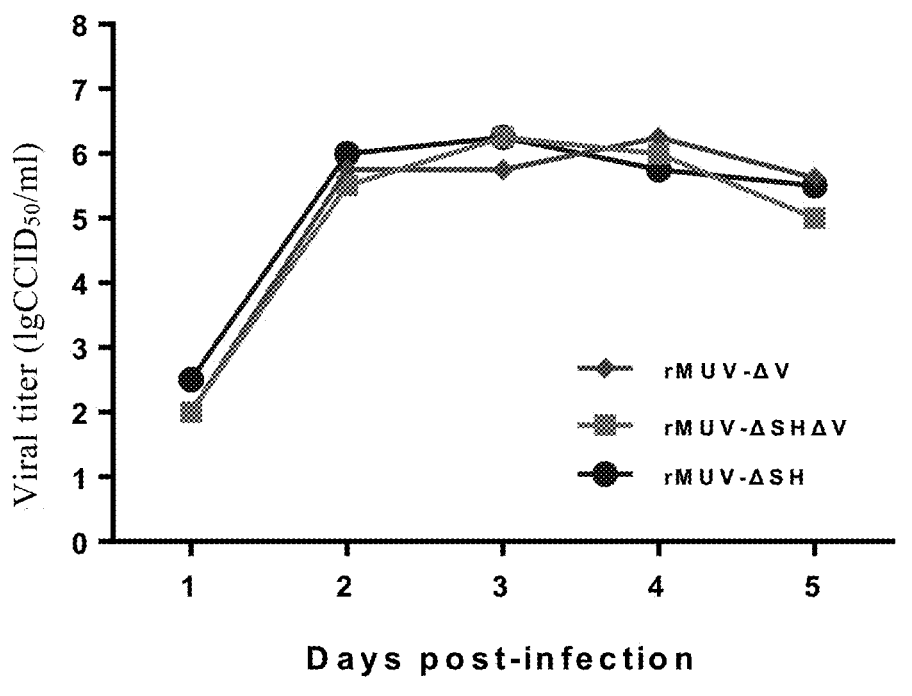

FIG. 5 shows the growth curves of three recombinant viruses on Vero cells.

Figure 6:
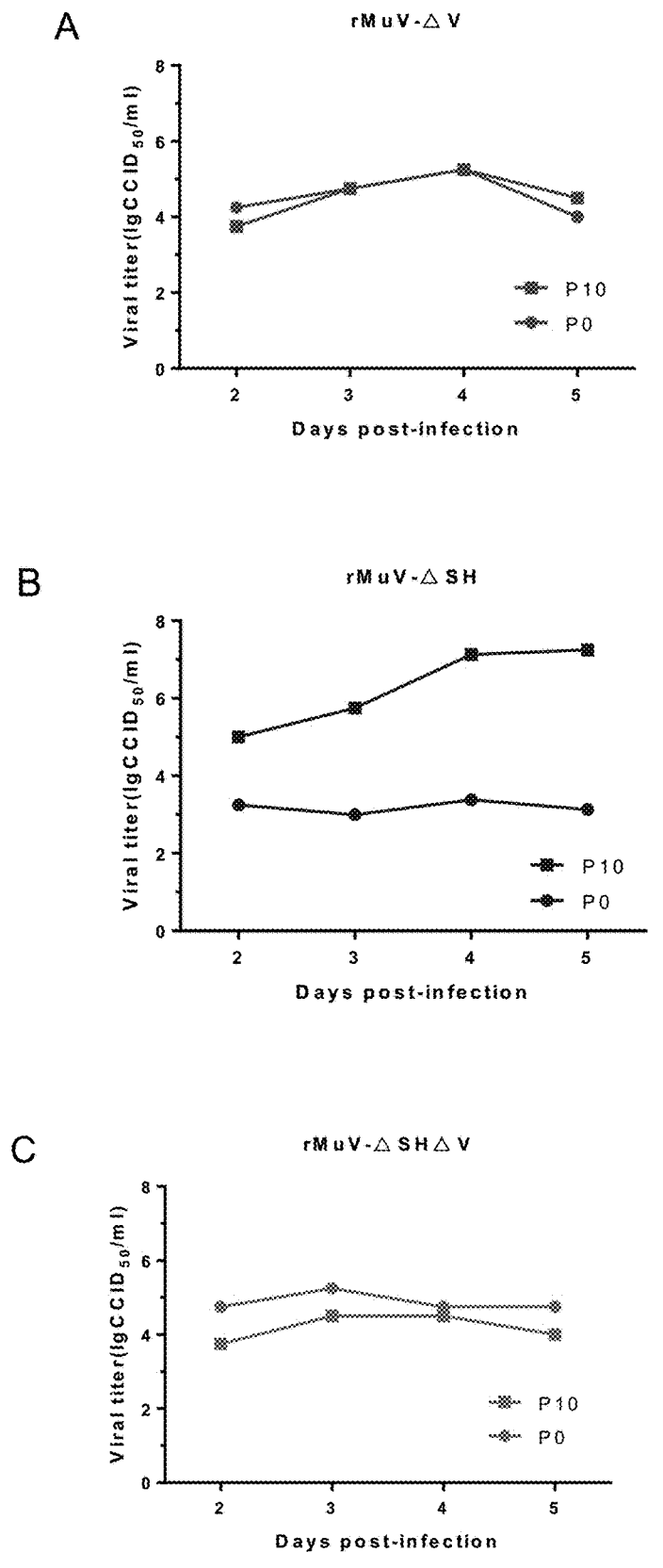

FIG. 6 shows the growth of three strains of virus on chicken embryo fibroblasts.

Wherein, A is rMuV-ΔV; B is rMuV-ΔSH; and C is rMuV-ΔSHΔV.

Figures 7, 8:
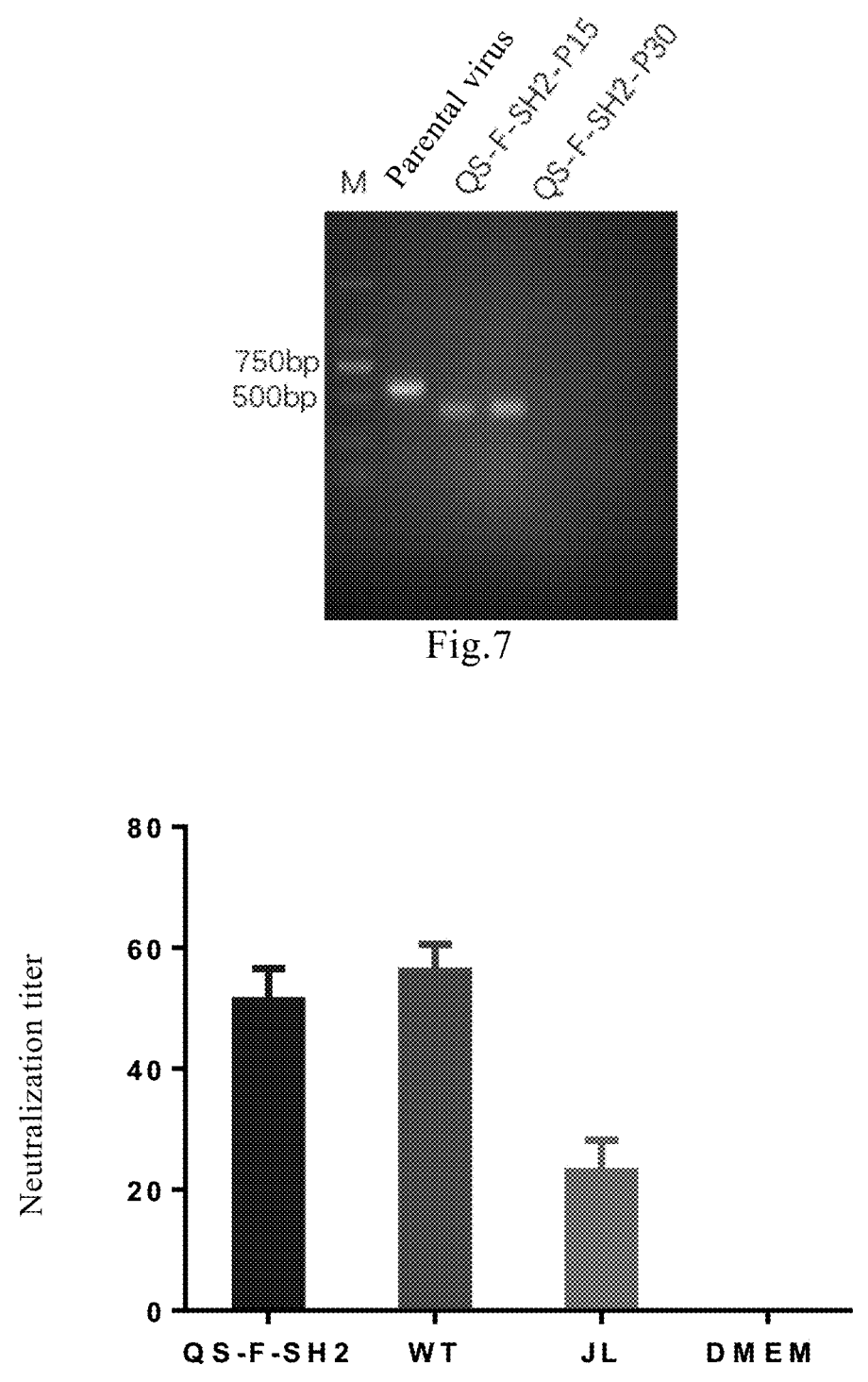

FIG. 7 shows the PCR assay results of QS-F-SH2-P15 and P30.

FIG. 8 shows the immunogenicity assay results of the QS-F-SH2 recombinant vaccine and each control.

Figure 9:
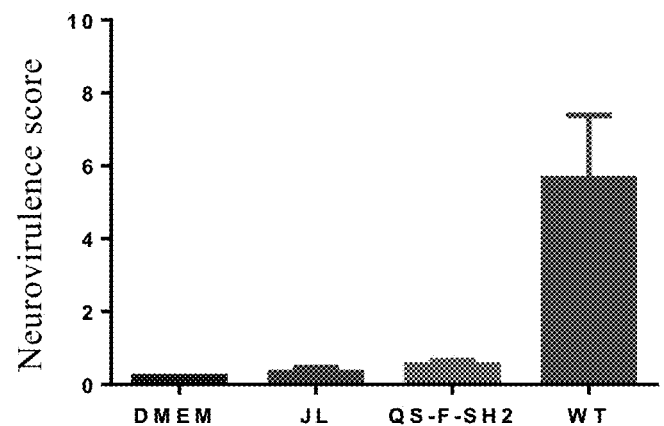
Figure 9:
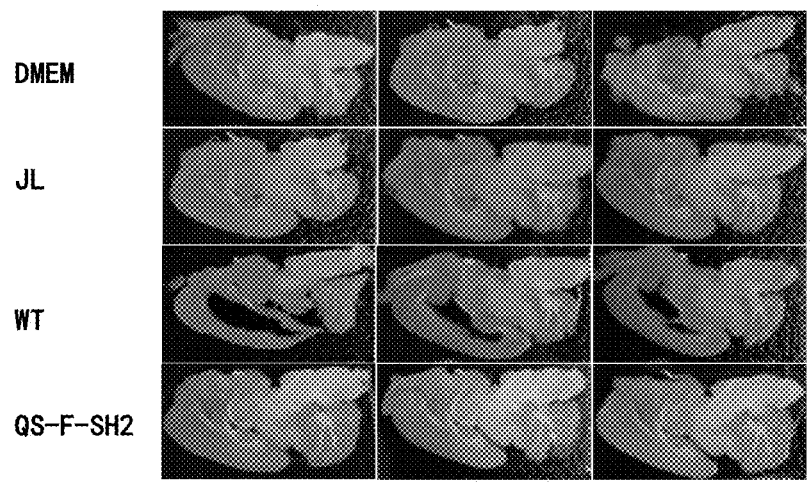

FIG. 9 shows the results of nerve virulence test in neonatal rats.

Wherein, A shows the statistical results of neurovirulence; B shows the results of neurovirulence.

DETAILED DESCRIPTION

After extensive and in-depth research, through a large number of screening, the inventors have developed for the first time a live attenuated vaccine of F genotype mumps that can be produced on a large scale in the primary chicken embryo fibroblasts. Specifically, the inventors used the reverse genetic operating system to delete the SH gene in the genome and retain other genes in the mumps virus strain of the F genotype, so as to obtain the SH gene-deleted mumps attenuated vaccine strain of F genotype.

Experiments have shown that the obtained SH gene-deleted mumps attenuated vaccine strain of F genotype can better match the predominant mumps virus of F genotype in China, and is comparable to the current vaccine strain in terms of growth characteristics, immunogenicity and neurotoxicity. Moreover, in the preparation process, using the preparation method of the present invention, compared with the traditional mumps virus weakening means, the weakening mechanism is clear and the period is shorter, which is more efficient. In addition, the genetically engineered attenuated strain of mumps virus screened by the present invention can be stably produced in chicken embryo cells with high safety.

On this basis, the present invention has been completed.
Current Status of Mumps Virus and F Genotype Mumps Virus Mumps virus is a member of the mumps virus genus of the Paramyxoviridae family. Its genome is a single negative-strand RNA without segmentation, with a length of 15384 bp. The entire genome encodes 7 viral proteins in the order of 3'-N-P-M-F-SH-HN-L-5. Among them, N protein, P protein and L protein form RNA replicase complex and participate in transcription and replication of virus. F and HN are important transmembrane glycoproteins and immunogens. SH protein contains 57 amino acids and is a non-essential protein for viral replication, which is related to TNF-α-mediated apoptosis.

Studies have shown that SH protein prevents apoptosis by inhibiting NF-κB signaling pathway in L929 cells. Once SH gene is deleted, the virus is easily cleared by host's innate immune response and shows decreased virulence.

It is particularly worth noting that the inventors have done a systematic study on the causes of repeated mumps outbreaks from the serological direction, and the results are as follows:

(1) F genotype virus is the absolute dominant group of mumps virus prevalent in China.

In 2015, the inventors and 6 provincial CDCs collected a large number of patient samples from China, and successfully isolated 29 strains of virus. The bioinformatics analysis shows that these virus strains are all F genotype, and the evolutionary relationship is close.

(2) The cross-protection ability of mumps vaccine of A genotype is limited.

Based on three immune models of human, guinea pig and mouse, the inventors conducted a large number of serological cross-neutralization experiments. The experimental results showed that the neutralizing ability of neutralizing antibodies produced by live attenuated mumps vaccine of A genotype (Jeryl Lynn strain) against the epidemic strain of genotype F was significantly lower than that against A genotype strain. At the same time, in guinea pig and mouse models, the neutralizing ability of antibodies produced by immunization with F genotype mumps virus to F genotype virus was slightly higher than that to A genotype virus.
The F Genotype Mumps Virus Attenuated Strain of the Present Invention In order to solve the above technical problems, the present invention is realized by the following technical solutions:

In the present invention, the F genotype mumps virus strain QS-F isolated from China is taken as a parent strain. A reverse genetic operating system is constructed and an SH gene deleted mumps attenuated vaccine candidate strain is constructed by using an improved method on this basis. The QS-F strain used in the present invention is derived from the F genotype mumps virus bank isolated by our company and six provincial CDCs (Jiangsu, Zhejiang, Beijing, Guangdong, Hubei and Shaanxi) in China since 2016.

The QS-F strain is finally obtained through stereotyped gene sequencing, bioinformatics analysis, serological comparison, immunogenicity analysis and in vitro phenotype identification. It has the characteristics of strong replication ability, high genetic stability and good immunogenicity, and has a good representation in the current epidemic F genotype mumps virus strains in China.

The deletion of CDS region of SH in the genome of the SH gene deleted mumps attenuated vaccine strain of F genotype constructed by the present invention is changed from 174 bases to 18 bases, resulting in the inability of the SH protein to be effectively expressed. The protein encoded by SH gene is directly related to the nerve virulence caused by mumps virus. SH protein can help mumps virus evade the innate immunity of the host by inhibiting the activation of NF-κB and TNF-α pathways. Once the SH gene is deleted, the mumps virus is more easily recognized by the host and triggers an immune response; therefore, the biosecurity of the deleted virus is effectively improved.

The full-length recombinant plasmid and helper plasmids of the QS-F were constructed to rescue the QS-F-SH2 virus through the reverse genetics operating system. The rescued virus was passaged, and the supernatant was harvested for PCR identification. The results showed that the recombinant virus strain QS-F-SH2 constructed by the present invention was successfully rescued; the multi-step growth curve showed that the QS-F-SH2 virus had similar growth kinetics to the parent virus. The virus was passaged in the primary chicken embryo fibroblast respectively for a long time and its whole gene sequence was determined. The results showed that the SH gene region of the virus was stable and had good genetic stability.

Specifically, in the present invention, it provides a F genotype mumps virus attenuated strain, and the attenuated strain is mumps virus QS-F-SH2 with a deposit number of CCTCC NO: V201950. Preferably, the genome of the F genotype mumps virus attenuated strain of the present invention contains the nucleotide sequence shown in SEQ ID NO: 3.

In addition, the present invention also provides a derived virus strain derived from the F genotype mumps attenuated vaccine strain described in claim 1, with one or more of the following characteristics:

(a) it is suitable for passage in primary cultured cells of chicken embryos, with a stable passage number ≥10, preferably, a stable passage number ≥15, and more preferably, a stable passage number ≥30;

(b) low virulence: the virulence index is equivalent to the virulence index of the mumps virus QS-F-SH2 whose deposit number is CCTCC NO: V201950; wherein, the virulence index is equivalent means that its virulence index is ≤150%, preferably ≤120%, more preferably ≤100% of the virulence index of F genotype mumps virus attenuated strain whose deposit number is CCTCC NO: V201950; wherein, the virulence index is the degree of ventricular edema;

(c) compared with wild-type F genotype mumps virus, the genome does not contain SH gene.

In the present invention, the genome of the derived virus strain contains the following nucleotide sequences:

(i) the nucleotide sequence shown in SEQ ID NO: 1 corresponding to the SH gene in the genome of the wild-type F genotype mumps virus is replaced by the nucleotide sequence shown in SEQ ID NO: 2; and (ii) the sequence identity to the nucleotide sequence shown in SEQ ID NO: 3 is ≥85%, preferably ≥90%, more preferably ≥95%.

In another embodiment, the genome of the derived virus strain contains the following nucleotide sequence:

(i) the nucleotide sequence shown in SEQ ID NO: 1 corresponding to the SH gene in the genome of the wild-type F genotype mumps virus is replaced by the nucleotide sequence shown in SEQ ID NO: 2; and (ii) the sequence identity to the nucleotide sequence shown in SEQ ID NO: 3 is ≥85%, ≥86%, ≥87%, ≥88%, ≥89%, ≥90%, ≥91%, ≥92%, ≥93%, ≥94%, ≥95%, ≥96%, ≥97%, ≥98%, or ≥99%.

```
Complete sequence of SH gene:
                              (SEQ ID NO: 1)
ATGCCGGCAATCCACCCTCCCTTATACCTAACATTT

CTATTGCTAATTCTTCTTCATCTGATCTTAAATTT

ATATGTCTGAATTATGCTAACCATTACTCACAAGA

CTGCGGTGCAACATGCAGCACTGTACCAGAGATCC

CTCTTTCGTTGGAGTTTCGATCACTCACTCTAGGe ne sequence after deletion of SH:

(SEQ ID NO: 2)
ATGCCGGCAGCTAGCTAG
```

In a preferred embodiment, the present invention adopts intramuscular injection into 6-week-old BALB/c female mice, and the mice do not show any abnormality. Immunization by intramuscular injection of hind limbs was performed twice, with an interval of 21 days, and the immunization dose was $4\times10^5$ $CCID_{50}/100$ μL. Fourteen days after the second immunization, the produced neutralizing antibody was measured. The results show that compared with JL vaccine strain, the QS-F-SH2 vaccine strain can effectively resist the attack of F genotype mumps virus, which is widely prevalent in China, and has good immunogenicity.

In a preferred embodiment of the present invention, the SH gene deleted mumps attenuated vaccine strain QS-F-SH2 constructed by the present invention, parental virus QS-F, JL vaccine (100 $CCID_{50}$/10 μL) and negative control DMEM 10 μL were used to infect 1-day-old suckling rats by intracranial injection, respectively. The suckling rats of each experimental group did not show any abnormal reaction during the observation period. After 25 days of intracranial injection, the left cerebral hemisphere of the experimental rat was subjected to vibratome section (2 mm from the sagittal suture), and the neurovirulence value was quantitatively calculated according to the size of the cavity of the third ventricle.

The results shows that the neurovirulence values of parental virus QS-F, QS-F-SH2 and JL strain are 5.66, 0.53 and 0.31 respectively. The parental virus has obvious neurovirulence, but the neurovirulence of QS-F-SH2 is not significantly different from that of the JL vaccine strain. Combined immunogenicity and neurovirulence, QS-F-SH2 has the potential to be a candidate vaccine strain for mumps.

The Mumps Virus Weakening Strategy of the Present Invention.

The traditional strategy of mumps virus attenuation is to screen out candidate strains with reduced virulence through in vitro culture under non-optimal conditions for a long time. However, since the weakening principle cannot be explained so far, a long time and a large number of evaluation tests are needed to determine the safety and genetic stability of the new vaccine strain. Therefore, the development period of vaccines is very long.

In the present invention, the cutting-edge technology of virology research, the reverse genetic operating technology, is used to directly construct the recombinant mumps virus with the deletion of virulence gene, and a live vaccine with a clear attenuation principle can be obtained.

In addition, the virulence evaluation model used in the present invention is a new generation of mumps virus neurovirulence evaluation system recommended by the International Association for Biological Standardization (IABS), the World Health Organization (WHO), the European Directorate for the Quality of Medicines & HealthCare (EDQM), the Center for Biologics Evaluation and Research of Food and Drug Administration (FDA CBER) and the European Union (EU), and relevant optimization has been conducted. Compared with the rhesus monkey neurovirulence assay, the evaluation method can more truly reflect the neurovirulence situation between attenuated strain and wild strain, with lower cost and shorter period.

The Method of the Present Invention

In the present invention, it provides a method for preparing an F genotype mumps virus attenuated strain, which comprises the steps:

(i) constructing a full-length recombinant plasmid of the F genotype mumps virus that lacks and only lacks the SH gene;

(ii) obtaining three helper plasmids containing the N gene, P gene and L gene in the mumps virus, respectively; and (iii) co-transfecting host cells with the full-length recombinant plasmid obtained in (i) and the three helper plasmids, and after culturing for 3 days, lysing the cells and inoculating into the new cells for culture, and when the cytopathy can be observed, the F genotype mumps virus attenuated strain is obtained.

In a preferred embodiment, the host cell is selected from the group consisting of BSR-T7 cells, 293T cells, Vero cells, Slam/Vero cells, and a combination thereof.

Vaccine Composition

In the present invention, it provides a method for preparing a vaccine composition, which comprises the steps:

(i) passaging or culturing the mumps virus QS-F-SH2 with a deposit number of CCTCC NO: V201950 to obtain an attenuated vaccine strain;

(ii) mixing the attenuated vaccine strain prepared in step (i) with an immunoacceptable carrier to produce the vaccine composition.

In the vaccine composition provided by the present invention, including:

(i) the F genotype mumps virus attenuated strain according to the first aspect of the present invention or the derived virus strain according to the second aspect of the present invention; and (ii) a vaccine acceptable carrier.

Preferably, the carrier is a pharmaceutically acceptable carrier. In a preferred embodiment, the pharmaceutically acceptable carrier comprises liquid, preferably water, saline or buffer.

The carrier may further contain an auxiliary substance, preferably a filler, a lubricant, a glidant, a wetting agent or an emulsifier, a pH buffer substance, etc.

In another preferred embodiment, the carrier further contains a cell transfection agent.

In the present invention, the vaccine composition is a dual vaccine or a multiple vaccine. Preferably, the vaccine composition further contains one or more vaccine components derived from pathogens selected from the group consisting of: measles, rubella, Japanese encephalitis, hepatitis A, chickenpox, polio, and a combination thereof.

In one embodiment, the vaccine component comprises an inactivated strain, an attenuated strain, or a protein, a nucleic acid, etc.

In the present invention, the vaccine composition further comprises an adjuvant. Preferably, the adjuvant comprises a granular and a non-granular adjuvant. In a preferred example, the granular adjuvant is selected from the group consisting of: aluminum salts, water-in-oil emulsions, oil-in-water emulsions, nanoparticles, micro-particles, liposomes, immunostimulatory complexes, and a combination thereof. In another preferred embodiment, the non-granular adjuvant is selected from the group consisting of muramyl dipeptide and its derivatives, saponins, lipid A, cytokines, derived polysaccharides, bacterial toxins, microorganisms and their products such as mycobacteria (*Mycobacterium tuberculosis*, BCG), *Bacillus pumilus, Bacillus pertussis*, propolis, and a combination thereof.

In the present invention, preferably, the virus in each dose of the vaccine composition is at least 3.7 lgCCID$_{50}$. In a more preferred embodiment, the vaccine composition is in the form of injection.

Deposit of Virus Strains

As used herein, the "F genotype mumps virus attenuated strain" and "mumps virus QS-F-SH2" of the present invention can be used interchangeably and have been deposited in China Center for Type Culture Collection (CCTCC, Wuhan University, Wuhan, China) on Jul. 25, 2019, with the accession number of CCTCC No: V201950.

In addition, the mumps virus QS-F isolated in the present invention has also been deposited in China Center for Type Culture Collection (CCTCC, Wuhan University, Wuhan, China) on Jul. 25, 2019, with the accession number of CCTCC No: V201948.

The Main Advantages of the Present Invention Include:

1) F genotype mumps virus strain is selected to match the genotype of the dominant epidemic strain in China.

2) The present invention utilizes a novel mumps virus weakening strategy and adopts reverse genetic operation to carry out the directed transformation of the virus. Compared with the traditional mumps virus weakening method, the weakening mechanism is clear and the weakening period is short; therefore, it is more efficient.

3) At present, foreign teams have only studied the growth characteristics of similar genetically engineered attenuated strains on Vero cells. The present invention has screened out a genetically engineered attenuated strain of mumps virus that can adapt to the production of chicken embryo cells, and has the conditions for production based on the requirements of the current pharmacopoeia, so it has an excellent application prospect.

4) It is consistent with the current vaccine strain in terms of growth characteristics, immunogenicity and neurovirulence.

The present invention is further explained below in conjunction with specific example. It should be understood that these examples are only for illustrating the present invention and not intend to limit the scope of the present invention. The conditions of the experimental methods not specifically indicated in the following examples are usually in accordance with conventional conditions as described in Sambrook et al., Molecular Cloning: A Laboratory Manual (New York: Cold Spring Harbor Laboratory Press, 1989), or according to the conditions recommended by the manufacturer. Unless otherwise stated, percentages and parts are percentages by weight and parts by weight.

Experimental Materials

The QS-F virus from throat swab samples was provided by Jiangsu Provincial Center for Disease Control and Prevention, which is isolated, identified and preserved by Shanghai Qingsai Biotechnology Co., Ltd. Vero Cells were provided by the Research and Development Center of the company. The pAC vector and pcDNA3.1 were used for the construction of the full-length plasmids and helper plasmids.

Example 1: Construction of a rMuV-ΔSH Deletion Virus 1.1 Construction of Full-Length Plasmid of QS-F Virus According to the sequence information of mumps F genotype provided on NCBI, universal primers were designed to sequence the whole genome of QS-F virus. The sequencing primer information is as follows:

TABLE 1

Sequence Information of Sequencing Primers

| Primer name | Primer sequence (5'-3') | SEQ ID NO: |
|---|---|---|
| MUV-N1-F | ACCAAGGGGAAAATGAAGATGG | 4 |
| MUV-N1400-F | GGGCCTGTGAATCCATTTGTTC | 5 |
| MUV-N1500-R | TGGAATCCTGCACCTCCATCTT | 6 |

TABLE 1-continued

Sequence Information of Sequencing Primers

| Primer name | Primer sequence (5'-3') | SEQ ID NO: |
|---|---|---|
| MUV-N2800-F | GGAATGATGGCGACCGTAAAGA | 7 |
| MUV-N2900-R | GAATGACACATCTCCTGGTCCA | 8 |
| MUV-N4200-F | CATCCACCAATCATCACCATCG | 9 |
| MUV-N4300-R | GTCATCAGTTTTTGCGAGTGAT | 10 |
| MUV-N5600-F | AGTCAAAACTATGCCTTGCAGG | 11 |
| MUV-N5700-R | CGTTAGACTTCGACAGTTTGCA | 12 |
| MUV-N7000-F | CTTGCCACAATCTGTACAAGC | 13 |
| MUV-N7100-R | GTGGATGGCCGATAGAGAAATC | 14 |
| MUV-N8400-F | TGAATGCAGCGGTAGGCCCTAT | 15 |
| MUV-N8500-R | ATATCTAACGATGGGTGAGTTC | 16 |
| MUV-N9800-F | GTATGAATATGTCCTCAAGAATTGG | 17 |
| MUV-N9900-R | CAGTCTTGCTTTGGACAGCTTA | 18 |
| MUV-N11200-F | CCAAACTAAATCCCTTAGTCAGG | 19 |
| MUV-N11300-R | CAGGCGACTACACGAGAGAAAG | 20 |
| MUV-N12600-F | GCTGTATAAGACCTGTTGAGTC | 21 |
| MUV-N12700-R | TCCATCTCTAGCAAACTGAGTG | 22 |
| MUV-N14000-F | AGAATCCTCCCCAACGCAATTT | 23 |
| MUV-N14100-R | CTGTTACCGTTCCAGAGTGGAT | 24 |
| MUV-N15384-R | ACCAAGGGGAGAAAGTAAAATC | 25 |

Figure 1:
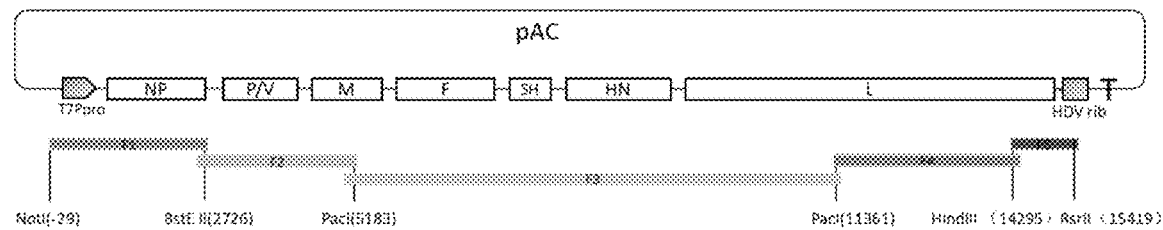
FIG. 1 shows a schematic diagram of the full-length clone of rMuV-ΔSH.

Primers were designed according to sequencing results, and F genotype QS-F was divided into 5 segments for cloning. The specific strategy is shown in FIG. 1.

Figure 2:
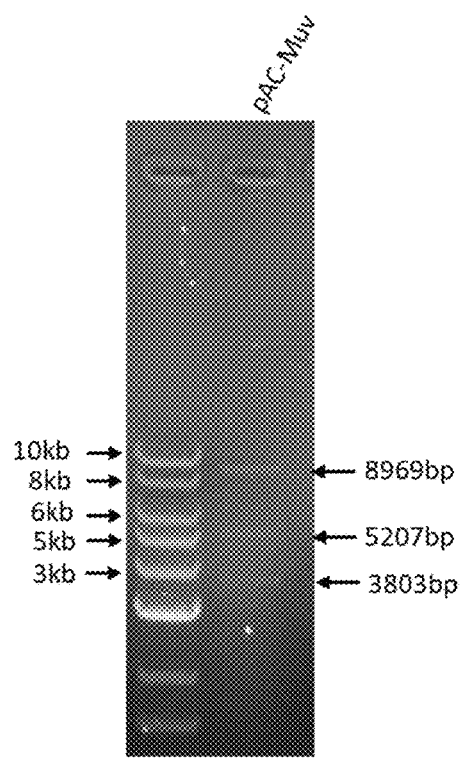
FIG. 2 shows a schematic diagram of the digestion of the full-length clone of rMuV-ΔSH.
Figure 3:
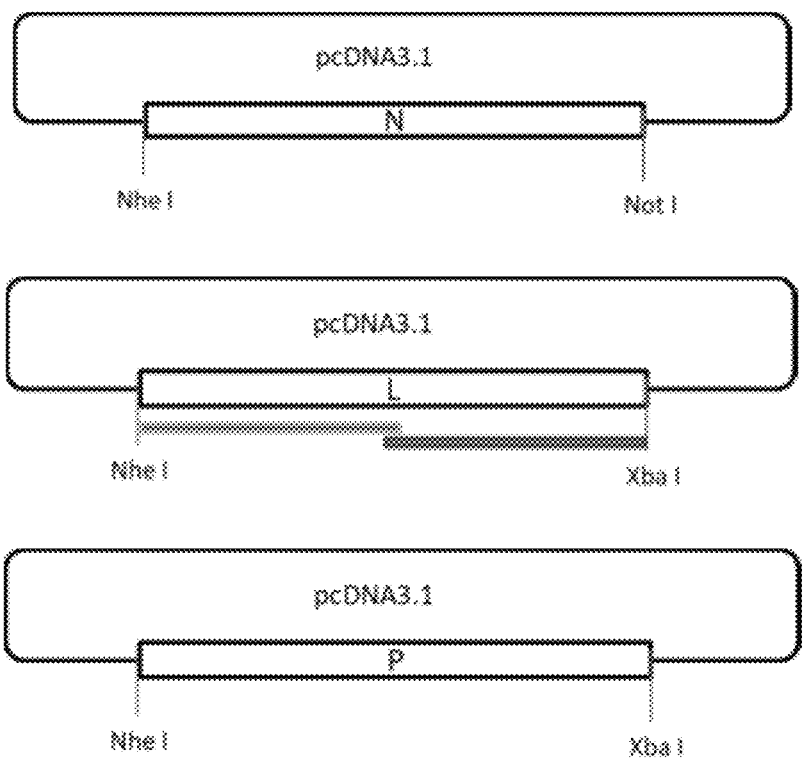
FIG. 3 shows a schematic diagram of the construction of helper plasmids.

Using pAc as a vector, F1 and F5 were doubly digested with Not I, BstE II and Not I and Rsr II respectively, to obtain plasmid pAC-F1, pAC-F5. Then F2 was doubly digested with BstE II, Rsr II, and F4 was doubly digested with Not I, Hind III, to obtain pAC-F1-F2, and pAC-F4-F5. The pAC-F4-F5 and pAC-F1-F2 were doubly digested by Pac I and Rsr II again to obtain the plasmid pAC-F1-F2-F4-F5. Fragment F3 was cloned by transitioning to T vector to obtain pMD18T-F3-1 and pMD18T-F3-2, and pMD18T-F3 was obtained by double enzyme digestion. The plasmids pAC-F1-F2-F4-F5 and pMD18T-F3 were singly digested with Pac I to finally obtain pAC-F1-F2-F3-F4-F5, namely pAC-MuV, and after the digestion of Hind III, the plasmid pAC-MuV was cut into three segments by 8969 bp, 5207 bp, and 3803 bp respectively. According to FIG. 2, it can be seen that the full-length plasmid of the QS-F virus was successfully constructed.

TABLE 2

Primer Sequences and Amplified Fragments

| Fragment | Primer sequence | Amplified fragment length | SEQ ID NO: |
|---|---|---|---|
| F1 | Muv-B-MP-1-F: TGCAGGCGGCCGCGTAATACGACTCACTATAG GGACCAAGGGGAAAATGAAGATGGGATATTGG | 2776 bp | 26 |
|  | Muv-B-MP-1-R: ATAAGAATGCGGCCGCGGTCACCATGCTGCCCT GTGCAAGCA |  | 27 |
| F2 | Muv-B-MP-2-F: TTGGCGCGCCAGCATGGTGACCCAAATAAAGAA | 2500 bp | 28 |
|  | Muv-B-MP-2-R: CTCGCGGACCGCCGGATTAATTAATTGGGGCTG AAAC |  | 29 |
| F3 | Muv-B-MP-3-F: TTGGCGCGCCCAATTAATTAATCCGGCACTGTC | 6224 bp | 30 |
|  | Muv-B-MP-3-R: ATAAGAATGCGGCCGCCAGCCAGCTTTAATTA ATCGTTTCAC |  | 31 |
| F4 | Muv-B-MP-4-F: TTGGCGCGCCGATTAATTAAAGCTGGCTGTTTAG | 2981 bp | 32 |
|  | Muv-B-MP-4-R: ATAAGAATGCGGCCGCCCCATGAAGCTTTCAA GATTAGC |  | 33 |
| F5 | Muv-B-MP-5-F: TTGGCGCGCCTTGAAAGCTTCATGGGAACCTT | 1142 bp | 34 |
|  | Muv-B-MP-5-R: GGTCGGACCGCGAGGAGGTGGAGATGCCATGC CGACCCACCAAGGGGAGAAAGTAAAATC |  | 35 |
| pAC | PAC-B-F: ATAAGAATGCGGCCGCCTAGCATAACCCCTTG GGGCCTC | 2631 bp | 36 |
|  | PAC-B-R: TTGGCGCGCCTGCAGCTGGCGCCATCGATACGC GTA |  | 37 |

1.2 Construction and Identification of Infectious Clone of rMuV-ΔSH Deletion Virus The primer sequences were designed according to the obtained pAC-MuV, and the SH gene was deleted from the original 174bp to 18bp: TTTCTAGCTAGCTGCCGGCAT-AGTGCAACGGCAGGGT (SEQ ID NO: 39). The vector was doubly digested with Pml I and Apa I, then the homology arms L and R were amplified by PCR using the following primers. Then the fusion PCR was performed, and the target fragment was subjected to homologous recombination with the digested vector to obtain the SH gene deleted full-length recombinant plasmid. The primer information is shown in the following table:

TABLE 3

Primer Sequences and Amplified Fragments

| Fragment | Primer sequence | Amplified fragment length | SEQ ID NO: |
|---|---|---|---|
| SH-L-F | ACAGACAAATGCACGTGCGATAGCGG | 1354 bp | 38 |
| SH-L-R | TTTCTAGCTAGCTGCCGGCATAGTGC AACGGCAGGGT | | 39 |
| SH-R-F | CCGGCAGCTAGCTAGAAAGATCTCCA ACCCGGACA | 2149 bp | 40 |
| SH-R-R | ATTTGCTAGTGGGCCCAAGTCATCTG GCTCC | | 41 |

1.3 Construction of Helper Plasmids

According to the full-length gene information of QS-F virus obtained from sequencing results, primers were designed to amplify N, P and L and they were connected to pcDNA3.1 to obtain plasmids pcDNA3.1-N, pcDNA3.1-P and pcDNA3.1-L.

1.4 Rescue and Identification of Virus

The full-length plasmid of SH gene deleted QS-F virus and helper plasmids were extracted in large quantities with the Sigma Endotoxin Removal Kit; and then they were co-transfected into cells. The cells were inoculated in a six-well plate for overnight culture, and cell wells with a cell confluence of 80-90% were selected for virus rescue. The specific process is as follows: the full-length plasmid pAC-MuV (7 μg), helper plasmids pcDNA3.1-N(1.5 μg), pcDNA3.1-P (0.2 μg), pcDNA3.1-L(1.0 μg) and Lipofectamine™ 2000 transfection reagent (12 μL) were mixed in 500 μL DMEM medium and incubated at 37° C. for 20 min; cells were washed 3 times with PBS, then the plasmid transfection reagent mixture was added into the cell wells and incubated at 37° C. for 6 h. Washed the cells 3 times with PBS, replaced with DMEM medium containing 2% serum and 1% antibiotic, and continued to culture cells at 37° C. for 3-4 days. Transfected cells were lysed and inoculated into Vero cells for culture. After the cells have obvious fusion lesions, the cell supernatant was collected and identified.

The following viruses were rescued: recombinant mumps virus with SH gene deletion (rMuV-ΔSH) (SH gene deletion changed from 174 bp to 18 bp), recombinant mumps virus with V gene deletion (rMuV-ΔV) (insert A at positions 2439-2430 and 2432-2433, and insert TAGC at position 3199), recombinant mumps virus with SH gene deletion and V gene deletion (rMuV-ΔSHΔV) (combined with the above two mutation methods).

Among them, the construction method of infectious cloning of rMuV-ΔV deletion virus and rMuV-ΔSHΔV deletion virus is similar to the construction method in Example 1.2.

1.5 PCR Detection

Figure 4:
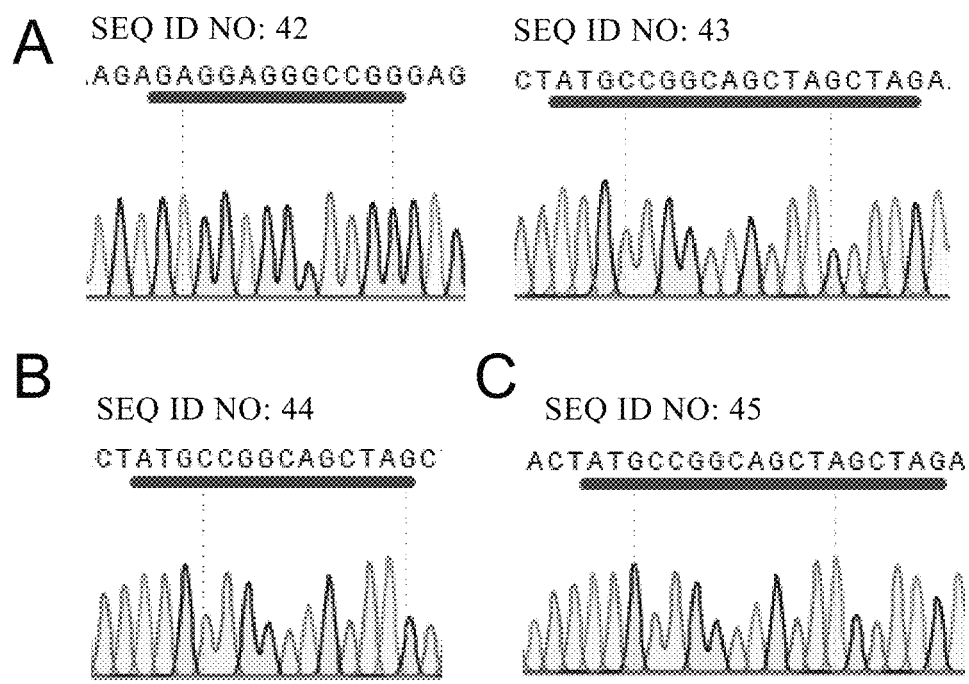
FIG. 4 shows the sequencing results of each recombinant virus.

The cell supernatants of the above virus rescue experiments were collected respectively. The collected cell supernatant was used to infect Vero cells. When lesions occurred in more than 50% of the cells, the cells were collected and lysed with TRIZOL. Total RNA was extracted, and reverse transcription was carried out. The specific primer SH-F/SH-R were used for PCR detection, and the amplified fragments were subjected to gene sequencing. The results are shown in FIG. 4.

1.6 Experimental Conclusion

According to the typical pathological characteristics caused by the virus in Vero cells and the sequencing results of the rescued virus genome, the recombinant mumps virus with SH gene deletion, V gene deletion, and SH gene and V gene deletion was successfully constructed.

Example 2: Growth Characteristics and Genetic Stability of Recombinant Viruses 2.1 Growth Characteristics of Recombinant Virus The three recombinant viruses were inoculated into Vero cells grown into monolayers in a 24-well plate at MOI=0.01 (volume of 300 μL), respectively. After 1 h of infection, the cells were washed three times with PBS and continued to be cultured in DMEM medium containing 2% fetal bovine serum. Cell supernatant was collected at 1 d, 2 d, 3 d, 4 d and 5 d after virus inoculation respectively, and viral titer was determined. A multi-step growth curve was drawn to analyze the in vitro replication characteristics of the three strains of mumps virus.

The results are shown in FIG. 5. The growth kinetics curves of the three recombinant viruses in Vero cells have certain coincidence, and there is no significant difference in growth kinetics.

2.2 Passaging Adaptability of Recombinant Viruses in Chicken Embryos Cells

Three recombinant viruses were mixed with chicken embryo fibroblasts made from 9-11 days old chicken embryos at MOI=0.01 to inoculation. After 24h of inoculation, the cells were washed 3 times with PBS and continued to be cultured in DMEM medium containing 2% fetal bovine serum.

The three viruses were continuously passaged in chicken embryo fibroblasts to compare the in vitro replication characteristics of P0 and P10 generations.

The cells were inoculated at MOI=0.01. The cell supernatant was collected at 2 d, 3 d, 4 d and 5 d after virus inoculation, and the viral titer was measured. The multi-step growth curve was drawn to analyze the in vitro replication characteristics of the three mumps viruses.

The results are shown in FIG. 6. Comparing the growth characteristics of the three recombinant viruses on chicken embryo cells, the results showed that rMuV-ΔSHΔV and rMuV-ΔV did not significantly increase the viral titer on chicken embryo cells before and after the passage on chicken embryo cells, while rMuV-ΔSH P10 could better adapt to chicken embryo cells, and the viral titer thereof was significantly increased to meet the needs of vaccine production, which was named QS-F-SH2.

2.3 Genetic Stability of QS-F-SH2

The obtained QS-F-SH2 were continuously passaged in chicken embryo cells, and the SH gene was sequenced in the 15th and 30th generations. The results of agarose gel electrophoresis are shown in FIG. 7.

The results showed that the SH gene of QS-F-SH2 did not mutate during the passage, and the deletion of the SH gene was inherited stably.

2.4 Experimental Conclusion

From the above results, it can be seen that there is no significant difference in the growth kinetics of the three recombinant viruses, and all of them can reach higher titers. However, only QS-F-SH2 recombinant virus has good passaging adaptability on chicken embryo cells. Moreover, QS-F-SH2 recombinant virus has good genetic stability and has no mutation in the process of virus passage and proliferation, which has the potential to be a candidate strain of novel mumps vaccine.

Example 3: Immunogenicity Assay in Mice

Sixty SPF mice aged 6-8 weeks were selected and randomly divided into 4 groups, namely A, B, C and D. Group A was inoculated with commercial attenuated mumps vaccine JL at a dose of 4×10⁵ CCID₅₀/mouse, group B was inoculated with F genotype wild virus at a dose of 4×10⁵ CCID₅₀/mouse, group C was inoculated with recombinant vaccine QS-F-SH2 at a dose of 4×10⁵ CCID₅₀/mouse, and group D was inoculated with blank diluent. The inoculation site of each group was intramuscular injection in the hindlimb, 50 µL on each side. After 21 days of immunization, the same dose was used to boost the immunization once. After 14 days of the secondary immunization, blood was collected from the mice and serum was separated. The neutralization titer of the virus (attack virus: F genotype WT) was determined, and clinical observation of mice was carried out daily before and after immunization.

TABLE 4

Immunization program

| Grouping | Vaccines | Dosage (CCID$_{50}$) | Numbers (mice) | Sample collection |
|---|---|---|---|---|
| A | JL | 4 × 10⁵ | 15 | 14 days after the secondary immunization |
| B | WT | 4 × 10⁵ | 15 | 14 days after the secondary immunization |
| C | QS-F-SH2 | 4 × 10⁵ | 15 | 14 days after the secondary immunization |
| D | Diluent | 100 µL | | |

3.1 Virus Neutralization Assay

First, the serum to be tested was inactivated at 56° C. for 30 min, and then diluted by 2 times. 50 µL of each serum dilution was added to 50 µL of F genotype virus (containing 100 CCID$_{50}$) was added, and treated at 37° C. for 1 h. 100 µL DMEM cell culture medium containing 10% fetal bovine serum was added and the cells were cultured at 37° C. for 7 days with 5% $CO_2$. The lesions of the cells were observed under a microscope. The neutralization titer of serum antibody was calculated according to the formula. The results were statistically analyzed.

The results of the immunogenicity assay are shown in FIG. 8. Among them, the neutralization titer of JL (A genotype vaccine) to F genotype wild virus (epidemic strain) is significantly lower than that of F genotype wild virus. At the same time, it is equivalent to immune effect of genotype wild virus QS-F, that is, QS-F-SH2 maintains good immunogenicity.

Example 4: Viral Neurotoxicity Assay

Four SPF WISTAR pregnant rats were selected and randomly divided into four groups, namely A, B, C and D. After giving birth, intracranial injection experiments were performed on the suckling rats. Suckling rats of group A were inoculated with commercial mumps attenuated vaccine at a dose of 100 $CCID_{50}$/rat; suckling rats of group B were inoculated with F genotype wild virus at a dose of 100 $CCID_{50}$/rat; suckling rats of group C were inoculated with recombinant vaccine with gene deletion at a dose of 100 $CCID_{50}$/rat; suckling rats of group D were inoculated with blank diluent. The inoculation site of each group was 2 mm on the left side of the sagittal suture of the brain, between the bregma and the herringbone point, and the inoculation volume was 10 μL/rat. After 25 days of inoculation, the suckling mice were sacrificed, and the brains were taken for vibrating slices to analyze the degree of hydrocephalus, hydrocephalus=cross-sectional area of lateral ventricle/cross-sectional area of brain×100.

The experimental results are shown in FIG. 9. Pathological sections of brain tissue of suckling rats showed that the degree of hydrocephalus caused by gene deletion virus strain QS-F-SH2 was not significantly different from that of JL. Combined with the results of neutralizing antibodies, QS-F-SH2 shows highly attenuating characteristics, and is safe for suckling rat, and can resist the infection of mumps.

All literatures mentioned in the present application are incorporated by reference herein, as though individually incorporated by reference. In addition, it should be understood that after reading the above teaching content of the present invention, various changes or modifications may be made by those skilled in the art, and these equivalents also fall within the scope as defined by the appended claims of the present application.

The invention claimed is:

1. An F genotype mumps virus attenuated strain, which is mumps virus QS-F-SH2 with the accession number of CCTCC NO: V201950.

2. The F genotype mumps virus attenuated strain of claim 1, wherein the genome of the F genotype mumps virus attenuated strain contains the nucleotide sequence shown in SEQ ID NO: 3.

3. A vaccine composition, which comprises:
   (i) the F genotype mumps virus attenuated strain of claim 1; and
   (ii) a vaccine acceptable carrier.

4. The vaccine composition of claim 3, wherein the virus in each dose of the vaccine composition is at least 3.7 lgCCID50.

5. The vaccine composition of claim 3, wherein the vaccine composition is in the form of injection.

6. A method for preventing mumps, comprising administrating the F genotype mumps virus attenuated strain of claim 1 to a subject in need thereof.

7. A method for inoculating against mumps, comprising the step of:
   inoculating the F genotype mumps virus attenuated strain of claim 1, or the vaccine composition comprising the F genotype mumps virus attenuated strain to a subject in need thereof.

8. A method for preparing a F genotype mumps virus attenuated strain, which comprises the steps:
   (i) constructing a full-length recombinant plasmid of the F genotype mumps virus that lacks and only lacks the SH gene, comprising the nucleotide sequence represented by SEQ ID NO: 3;
   (ii) obtaining three helper plasmids containing the N gene, P gene and L gene in the mumps virus, respectively; and
   (iii) co-transfecting host cells with the full-length recombinant plasmid obtained in i) and the three helper plasmids, and after culturing for 3 days, lysing the cells and inoculating into the new cells for culture, and when the cytopathy can be observed, the F genotype mumps virus attenuated strain is obtained.

9. A method for preparing a vaccine composition, which comprises the steps:
   (i) passaging or culturing the mumps virus QS-F-SH2 with the accession number of CCTCC NO: V201950 to obtain an attenuated vaccine strain;
   (ii) mixing the attenuated vaccine strain prepared in step (i) with an immunoacceptable carrier to produce the vaccine composition.

* * * * *